(12) United States Patent
Chang et al.

(10) Patent No.: US 12,216,257 B2
(45) Date of Patent: Feb. 4, 2025

(54) PLASTIC LIGHT-FOLDING ELEMENT, IMAGING LENS ASSEMBLY MODULE AND ELECTRONIC DEVICE

(71) Applicant: LARGAN PRECISION CO., LTD., Taichung (TW)

(72) Inventors: Pei-Chi Chang, Taichung (TW); Wei-Chun Lo, Taichung (TW); Po-Lun Hsu, Taichung (TW); Lin-An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 349 days.

(21) Appl. No.: 17/575,713

(22) Filed: Jan. 14, 2022

(65) Prior Publication Data
US 2022/0244507 A1 Aug. 4, 2022

Related U.S. Application Data

(60) Provisional application No. 63/145,049, filed on Feb. 3, 2021.

(51) Int. Cl.
*G02B 13/00* (2006.01)
*B29C 45/00* (2006.01)
*B29D 11/00* (2006.01)

(52) U.S. Cl.
CPC ....... *G02B 13/0065* (2013.01); *G02B 13/007* (2013.01); *B29C 2045/0027* (2013.01); *B29D 11/0074* (2013.01)

(58) Field of Classification Search
CPC .... G02B 13/0065; G02B 13/007; G02B 5/04; B29D 11/00; B29D 11/0074
See application file for complete search history.

(56) References Cited

U.S. PATENT DOCUMENTS

| | | | |
|---|---|---|---|
| 10,067,320 B2 | 9/2018 | Lu et al. | |
| 10,133,037 B2 | 11/2018 | Chou | |
| 10,663,697 B2 | 5/2020 | Chou | |
| 2002/0030900 A1* | 3/2002 | Tominaga | B29C 45/2708 425/470 |

(Continued)

FOREIGN PATENT DOCUMENTS

TW 202020504 A 6/2020

*Primary Examiner* — Cara E Rakowski
(74) *Attorney, Agent, or Firm* — McClure, Qualey & Rodack, LLP

(57) ABSTRACT

A plastic light-folding element includes an incident surface, an exit surface, at least one reflective surface, at least one connecting surface and at least one gate vestige structure. The incident surface is configured to lead an imaging light enter the plastic light-folding element. The exit surface is configured to lead the imaging light exit the plastic light-folding element. The reflective surface is configured to fold the imaging light. The connecting surface is connected to the incident surface, the exit surface and the reflective surface. The gate vestige structure is disposed on the connecting surface. At least one of the incident surface, the exit surface and the reflective surface includes an optical portion and an arc step structure, the arc step structure is disposed on a periphery of the optical portion, and an arc is formed by the arc step structure centered on the optical portion.

16 Claims, 35 Drawing Sheets

(56) References Cited

U.S. PATENT DOCUMENTS

| | | | |
|---|---|---|---|
| 2007/0024739 A1* | 2/2007 | Konno | G02B 13/002 |
| | | | 348/337 |
| 2007/0077057 A1* | 4/2007 | Chang | H04N 23/55 |
| | | | 396/351 |
| 2015/0260988 A1* | 9/2015 | Sugihara | G02B 27/0172 |
| | | | 359/833 |
| 2019/0230262 A1* | 7/2019 | Wang | F03G 7/0614 |
| 2020/0064527 A1 | 2/2020 | Shigemitsu et al. | |
| 2020/0073028 A1 | 3/2020 | Shigemitsu et al. | |
| 2020/0158953 A1* | 5/2020 | Tohara | G02B 25/001 |
| 2022/0294945 A1* | 9/2022 | Zhao | G03B 17/17 |

* cited by examiner

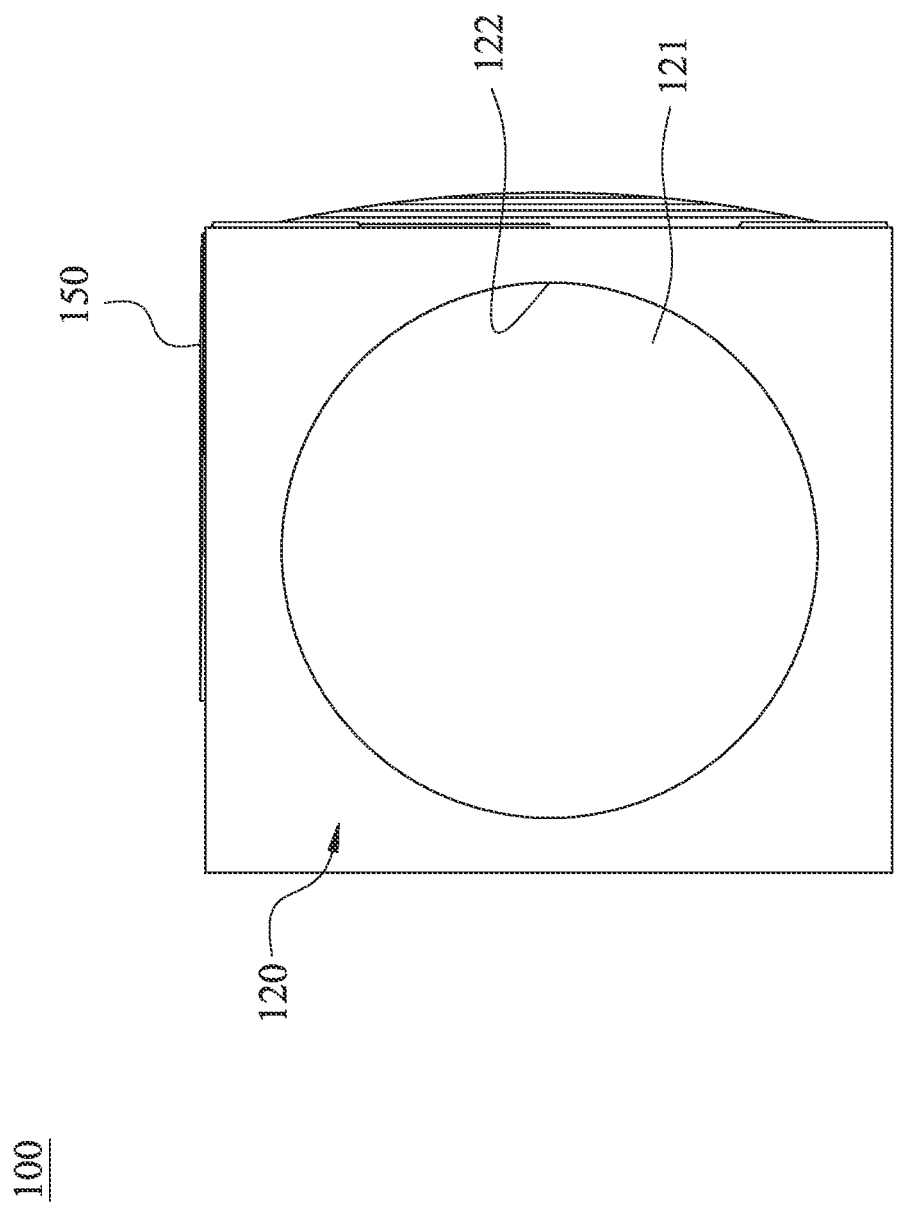

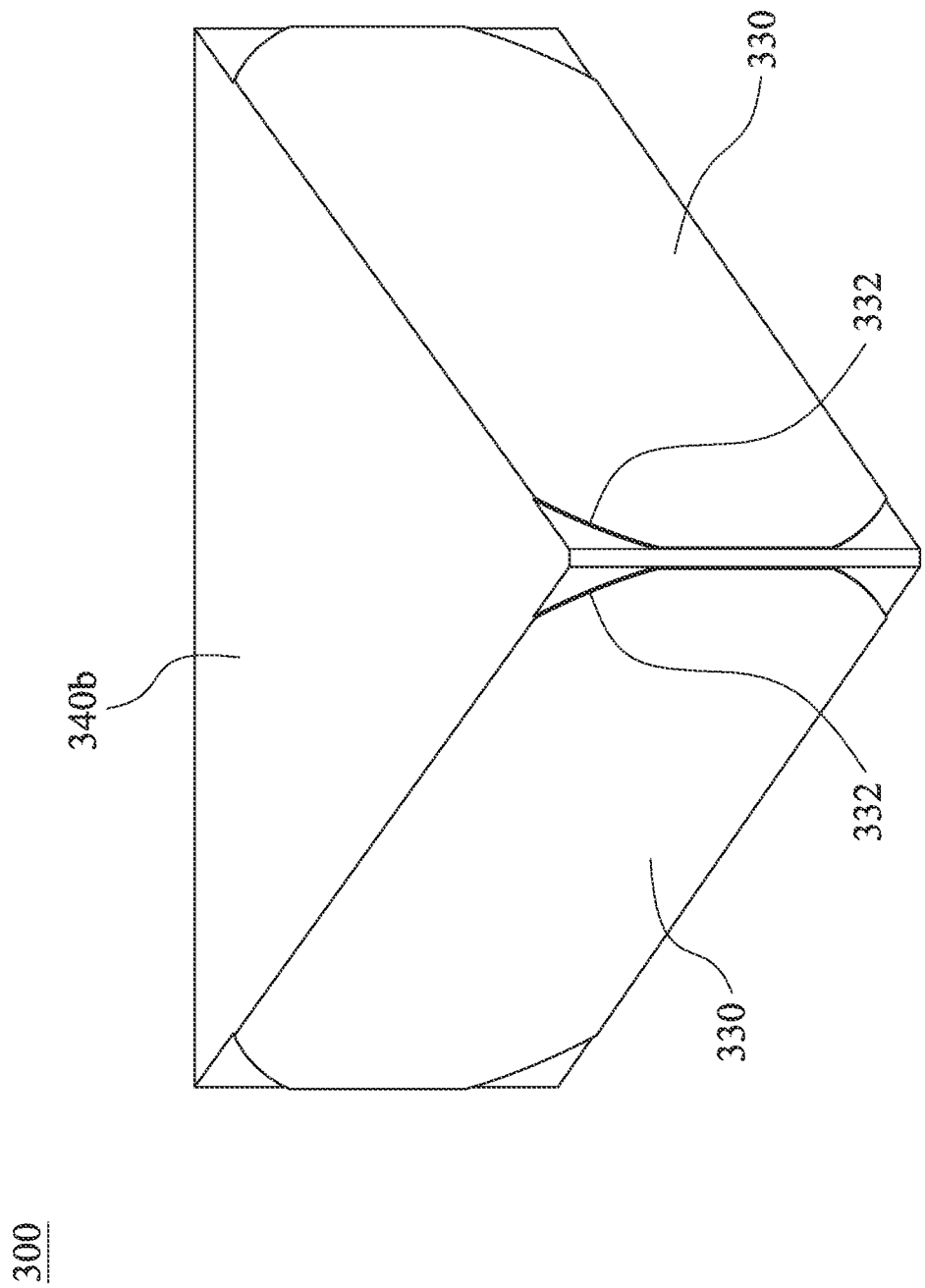

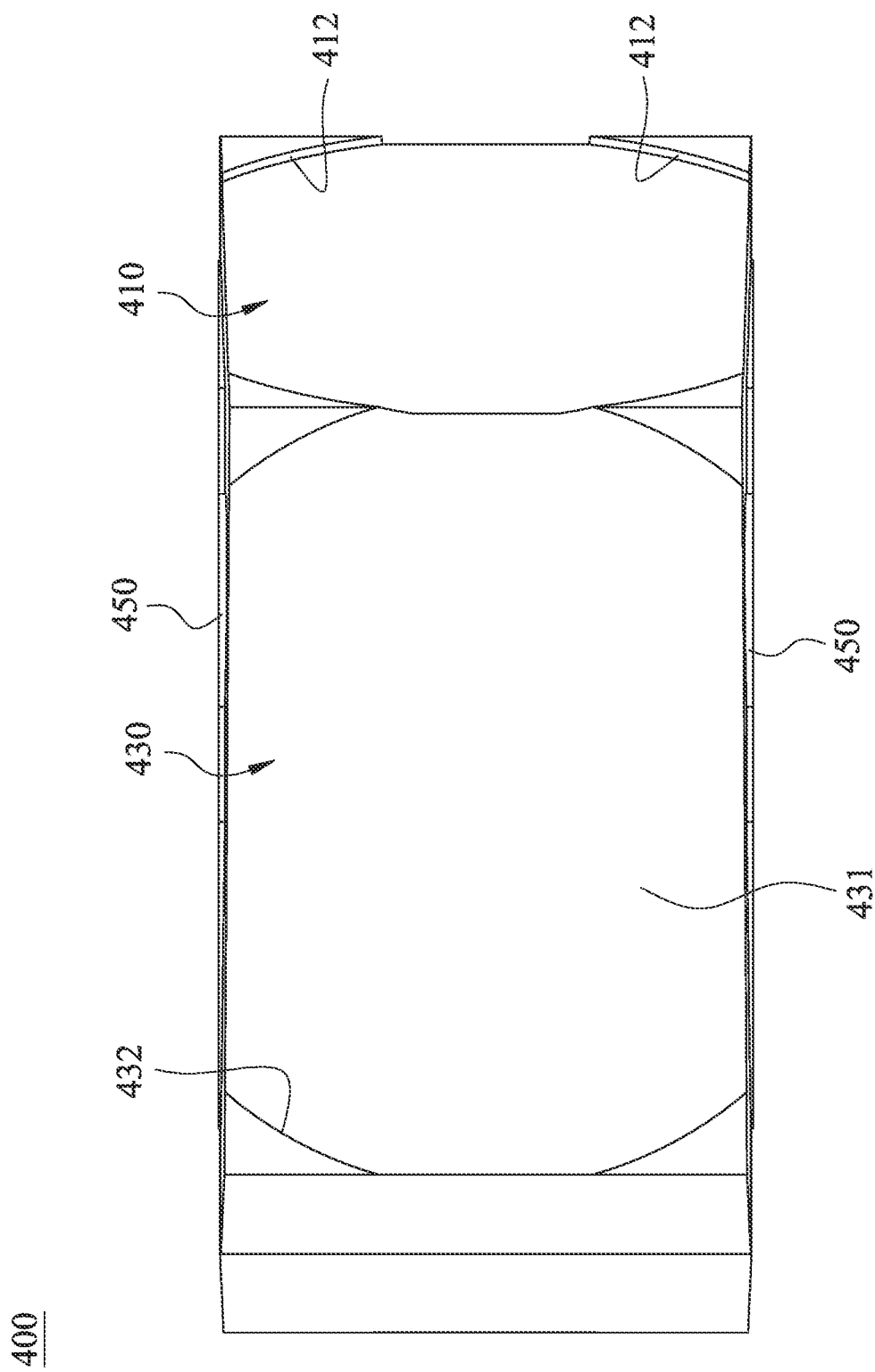

PLASTIC LIGHT-FOLDING ELEMENT, IMAGING LENS ASSEMBLY MODULE AND ELECTRONIC DEVICE

RELATED APPLICATIONS

This application claims priority to U.S. Provisional Application Ser. No. 63/145,049, filed Feb. 3, 2021, which is herein incorporated by reference.

BACKGROUND

Technical Field

The present disclosure relates to a plastic light-folding element and an imaging lens assembly module. More particularly, the present disclosure relates to a plastic light-folding element and an imaging lens assembly module applicable to portable electronic devices.

Description of Related Art

In recent years, portable electronic devices have developed rapidly. For example, intelligent electronic devices and tablets have been filled in the lives of modern people, and imaging lens assembly modules and plastic light-folding elements thereof mounted on portable electronic devices have also prospered. However, as technology advances, the quality requirements of the plastic light-folding elements are becoming higher and higher. Therefore, a plastic light-folding element, which can stably control the filling of the plastic material during the injection process, needs to be developed.

SUMMARY

According to one aspect of the present disclosure, a plastic light-folding element includes an incident surface, an exit surface, at least one reflective surface, at least one connecting surface and at least one gate vestige structure. The incident surface is configured to lead an imaging light enter the plastic light-folding element. The exit surface is configured to lead the imaging light exit the plastic light-folding element. The reflective surface is configured to fold the imaging light. The connecting surface is connected to the incident surface, the exit surface and the reflective surface. The gate vestige structure is disposed on the connecting surface. At least one of the incident surface, the exit surface and the reflective surface includes an optical portion and an arc step structure, the arc step structure is disposed on a periphery of the optical portion, and an arc is formed by the arc step structure centered on the optical portion. When an area of the gate vestige structure on the connecting surface is Ag, and a total area of the connecting surface is At, the following condition is satisfied: $33\% \leq Ag/At \leq 90\%$.

According to one aspect of the present disclosure, an imaging lens assembly module includes the plastic light-folding element of the aforementioned aspect and an imaging lens element set, wherein the plastic light-folding element is disposed on one of an object side and an image side of the imaging lens element set.

According to one aspect of the present disclosure, an electronic device includes the imaging lens assembly module of the aforementioned aspect and an image sensor, wherein the image sensor is disposed on an image surface of the imaging lens assembly module.

BRIEF DESCRIPTION OF THE DRAWINGS

FIG. 3C is another three-dimensional view of the plastic light-folding element according to the 3rd example in FIG. 3A.

FIG. 4E is another schematic view of the incident surface and the reflective surface of the plastic light-folding element according to the 4th example in FIG. 4A.

DETAILED DESCRIPTION

Figure 1A:
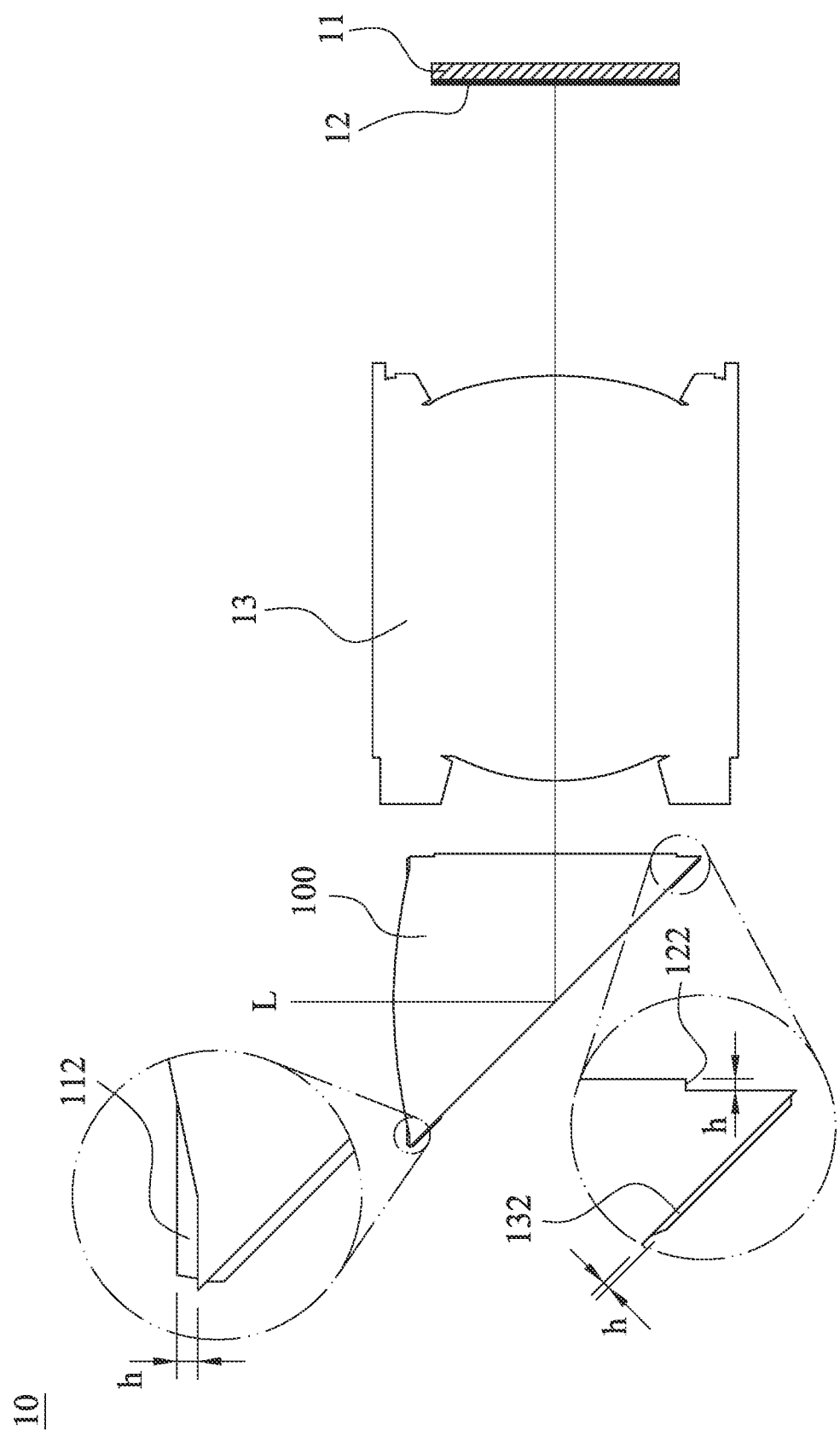
FIG. 1A is a schematic view of an electronic device according to the 1st example of the present disclosure.

The present disclosure provides a plastic light-folding element, which includes an incident surface, an exit surface, at least one reflective surface, at least one connecting surface and at least one gate vestige structure. The incident surface is configured to lead an imaging light enter the plastic light-folding element. The exit surface is configured to lead the imaging light exit the plastic light-folding element. The reflective surface is configured to fold the imaging light. The connecting surface is connected to the incident surface, the exit surface and the reflective surface. The gate vestige structure is disposed on the connecting surface. At least one of the incident surface, the exit surface and the reflective surface includes an optical portion and an arc step structure, the arc step structure is disposed on a periphery of the optical portion, and an arc is formed by the arc step structure centered on the optical portion. When an area of the gate vestige structure on the connecting surface is Ag, and a total area of the connecting surface is At, the following condition is satisfied: 33% Ag/At 90%. By the gate vestige structure with the high area ratio, the filling speed of the plastic material can be more stably controlled during the injection process of the plastic light-folding element. Therefore, the remaining of the flowing trace of the plastic material during the injection process can be avoided to reduce the defect. Furthermore, the surface accuracy of the optical surface can be further controlled by the arc step structure disposed on the optical surface to reduce the dimensional tolerance of the optical surface.

The plastic light-folding element can be formed by the injection molding, the plastic light-folding element includes a transparent plastic material, and the reflective surface can be configured to reflect the imaging light by the high reflective film or the total internal reflection. Moreover, all of the incident surface, the exit surface and the reflective surface can be the optical surfaces.

The shape of the gate vestige structure can be rectangle, trapezoid, circle, semicircle, triangle, polygon or a combination of the above shapes, but the shape of the gate vestige structure is not limited thereto. Further, the surface characteristic of the gate vestige structure is different from the surface characteristic of the connecting surface without the gate vestige structure.

The arc step structure can be an entire circle or include a plurality of arcs. In detail, the arcs are spaced apart from each other. Furthermore, the arc step structure can be a convex step or a concave step, wherein the convex step is that the optical portion is higher than the periphery of the optical portion, and the concave step is that the optical portion is lower than the periphery of the optical portion.

Each of at least two of the incident surface, the exit surface and the reflective surface can include the optical portion and the arc step structure, each of the arc step structures is disposed on the periphery of each of the optical portions, and the arc is formed by each of the arc step structures centered on each of the optical portions. By disposing the arc step structure on each of at least two of the optical surfaces, the coaxiality of each of the optical surfaces can be enhanced to maintain the higher image resolution after the imaging light passing through the plastic light-folding element.

Each of the incident surface, the exit surface and the reflective surface can include the optical portion and the arc step structure, each of the arc step structures is disposed on the periphery of each of the optical portions, and the arc is formed by each of the arc step structures centered on each of the optical portions. By disposing the arc step structure on each of the optical surfaces, the optical characteristics of the physical components are much closer to the simulation value of the optical design.

A number of the connecting surface can be two, both of the connecting surfaces are connected to the incident surface, the exit surface and the reflective surface, and the connecting surfaces are correspondingly disposed. Therefore, the complexity of the mold can be simplified to reduce the manufacturing cost of the product.

A number of the gate vestige structure can be two, and the gate vestige structures are disposed on the connecting surfaces, respectively. Therefore, the molding efficiency can be enhanced, and the structural integrity of the arc step structure can be maintained.

The connecting surfaces can be essentially parallel to each other. Therefore, the entire light path is hardly skewed or deflected to lower the probability of the non-imaging light.

The connecting surface can be essentially orthogonal to the incident surface, the exit surface and the reflective surface, respectively. Therefore, the aforementioned disposition is favorable for the structural design of the mold release.

The optical portion can include a smooth surface. Therefore, the better flatness of the optical surface can be provided.

The optical portion can include an optical aspheric surface located on a center of the optical portion. In particular, the plastic light-folding element can have the optical refractive power, hence, the plastic light-folding element is favorable for correcting the aberration to obtain the imaging quality with the high resolution.

A number of the reflective surface can be two, and both of the reflective surfaces are configured to fold the imaging light. Therefore, the number of the reflective surfaces can be provided according to the optical requirements and the mechanical requirements, so that the suitable disposition of the light path can be obtained to achieve the compact size.

The reflective surfaces can be essentially orthogonal to each other. Therefore, the light path of the focus driving distance can be shortened.

Each of the incident surface, the exit surface and the two reflective surfaces can include the optical portion and the arc step structure, each of the arc step structures is disposed on the periphery of each of the optical portions, and the arc is formed by each of the arc step structures centered on each of the optical portions. By disposing the arc step structure on each of the optical surfaces, the optical characteristics of the physical components are much closer to the simulation value of the optical design.

The gate vestige structure can include an arc rim extending from a center of the gate vestige structure towards an outer side of the gate vestige structure. Therefore, the gate vestige structure can have the stable and fast injection rate to provide the feasibility of the mass production.

When the area of the gate vestige structure on the connecting surface is Ag, and the total area of the connecting surface is At, the following condition can be satisfied: 35%≤Ag/At≤80%. Therefore, both of the fast injection rate and the high dimensional accuracy can be taken into consideration to provide the higher yield rate of the molding.

When an abbe number of the plastic light-folding element is V, the following condition can be satisfied: 40≤V≤72. Therefore, the optical dispersion can be lowered, so that the optical aberration can be corrected to enhance the imaging quality.

When a step height of the arc step structure is h, the following condition can be satisfied: 0.003 mm<h<0.32 mm. By the range of the step height which is favorable for identifying, the horizontal standard of the optical surfaces can be provided to ensure the appropriate flatness of the optical surfaces. Further, the following condition can be satisfied: 0.005 mm≤h≤0.17 mm.

Each of the aforementioned features of the plastic light-folding element can be utilized in various combinations for achieving the corresponding effects.

The present disclosure provides an imaging lens assembly module, which includes the aforementioned plastic light-folding element and an imaging lens element set, wherein the plastic light-folding element is disposed on one of an object side and an image side of the imaging lens element set. In particular, the plastic light-folding element is suitable for the telephoto imaging lens assembly module (that is, the full view is less than 40 degrees). Therefore, the volume of the imaging lens assembly module can be effectively reduced.

The present disclosure provides an electronic device, which includes the aforementioned imaging lens assembly module and an image sensor, wherein the image sensor is disposed on an image surface of the imaging lens assembly module.

According to the aforementioned embodiment, specific examples are provided, and illustrated via figures.

1st Example

FIG. 1A is a schematic view of an electronic device 10 according to the 1st example of the present disclosure. In FIG. 1A, the electronic device 10 includes an imaging lens assembly module (its reference numeral is omitted) and an image sensor 11, wherein the image sensor 11 is disposed on an image surface 12 of the imaging lens assembly module. Furthermore, the imaging lens assembly module includes a plastic light-folding element 100 and an imaging lens element set 13, wherein the plastic light-folding element 100 is disposed on one of an object side and an image side of the imaging lens element set 13. According to the 1st example, the plastic light-folding element 100 is disposed on the object side of the imaging lens element set 13. In particular, the plastic light-folding element 100 is suitable for the telephoto imaging lens assembly module (that is, the full view is less than 40 degrees). Therefore, the volume of the imaging lens assembly module can be effectively reduced.

Figure 1B:
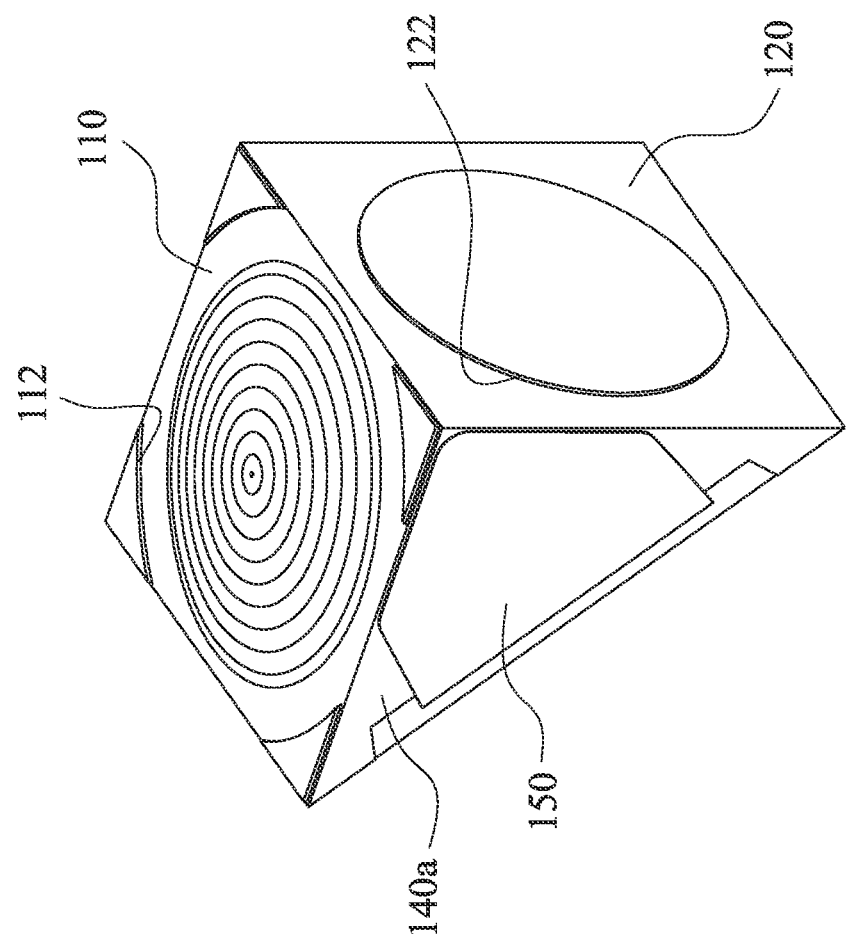
FIG. 1B is a three-dimensional view of the plastic light-folding element according to the 1st example in FIG. 1A.

FIG. 1B is a three-dimensional view of the plastic light-folding element 100 according to the 1st example in FIG. 1A. FIG. 10 is another three-dimensional view of the plastic light-folding element 100 according to the 1st example in FIG. 1A. In FIGS. 1B and 10, the plastic light-folding element 100 includes an incident surface 110, an exit surface 120, at least one reflective surface 130, connecting surfaces 140a, 140b and at least one gate vestige structure 150. The incident surface 110 is configured to lead an imaging light L enter the plastic light-folding element 100. The exit surface 120 is configured to lead the imaging light L exit the plastic light-folding element 100. The reflective surface 130 is configured to fold the imaging light L. Both of the connecting surfaces 140a, 140b are connected to the incident surface 110, the exit surface 120 and the reflective surface 130. The gate vestige structure 150 is disposed on the connecting surface 140a. According to the 1st example, a number of the reflective surface is one, a number of the connecting surfaces is two, a number of the gate vestige structure is one, but the present disclosure is not limited thereto.

The plastic light-folding element 100 can be formed by the injection molding, the plastic light-folding element 100 includes a transparent plastic material, and the reflective surface 130 can be configured to reflect the imaging light L by the high reflective film or the total internal reflection. Moreover, all of the incident surface 110, the exit surface 120 and the reflective surface 130 can be the optical surfaces. In particular, by the gate vestige structure 150 with the high area ratio, the filling speed of the plastic material can be more stably controlled during the injection process of the plastic light-folding element 100. Therefore, the remaining of the flowing trace of the plastic material during the injection process can be avoided to reduce the defect.

In particular, the connecting surfaces 140a, 140b are correspondingly disposed. Therefore, the complexity of the mold can be simplified to reduce the manufacturing cost of the product. Further, the connecting surfaces 140a, 140b are essentially orthogonal to the incident surface 110, the exit surface 120 and the reflective surface 130, respectively. Therefore, the aforementioned disposition is favorable for the structural design of the mold release.

Figure 1C:
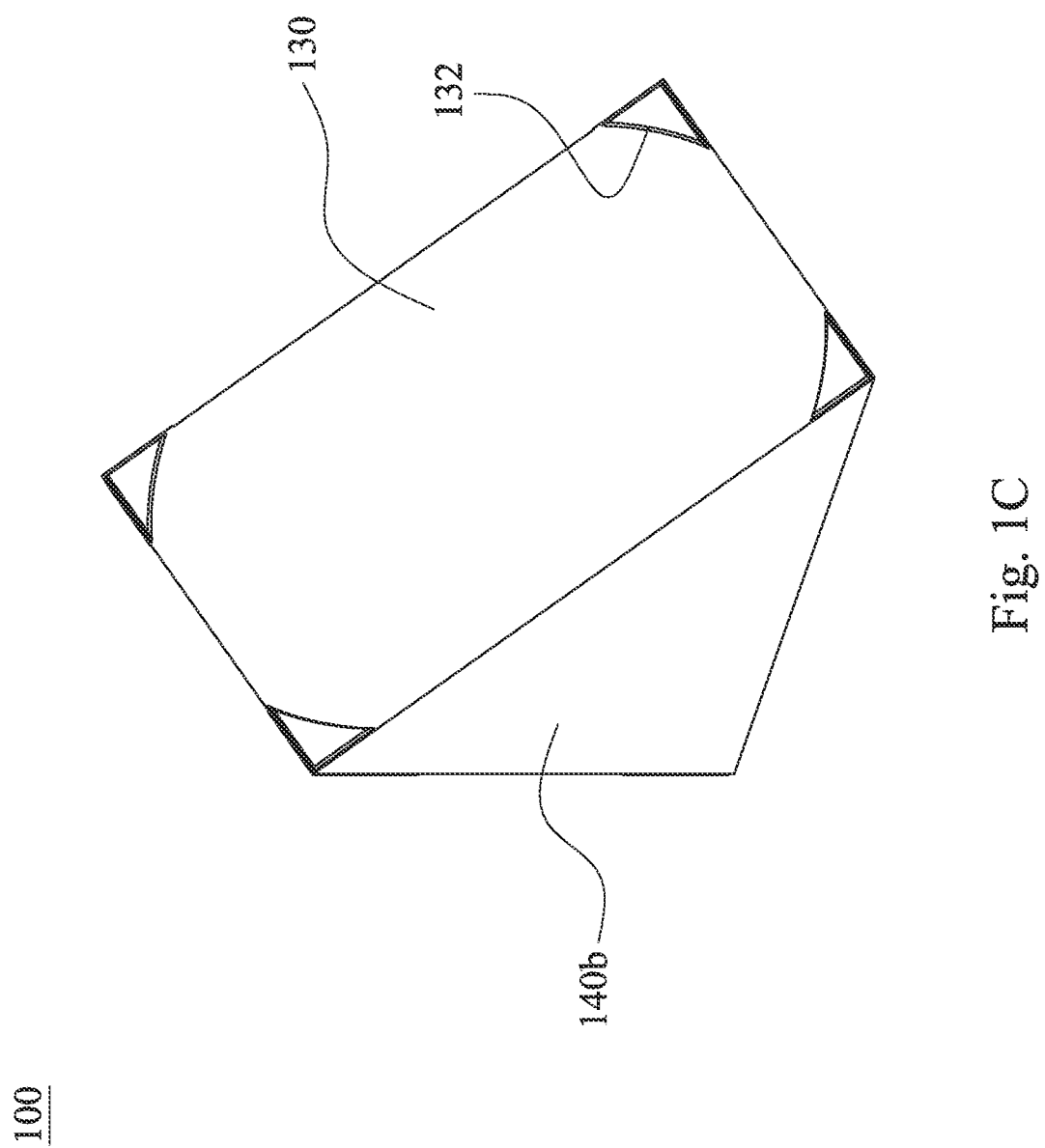
FIG. 1O is another three-dimensional view of the plastic light-folding element according to the 1st example in FIG. 1A.
FIG. 1D is a schematic view of the incident surface of the plastic light-folding element according to the 1st example in FIG. 1A.
FIG. 1E is a schematic view of the reflective surface of the plastic light-folding element according to the 1st example in FIG. 1A.
FIG. 1F is a schematic view of the exit surface of the plastic light-folding element according to the 1st example in FIG. 1A.
FIG. 1G is a schematic view of the parameters of the plastic light-folding element according to the 1st example in FIG. 1A.
Figure 1D:
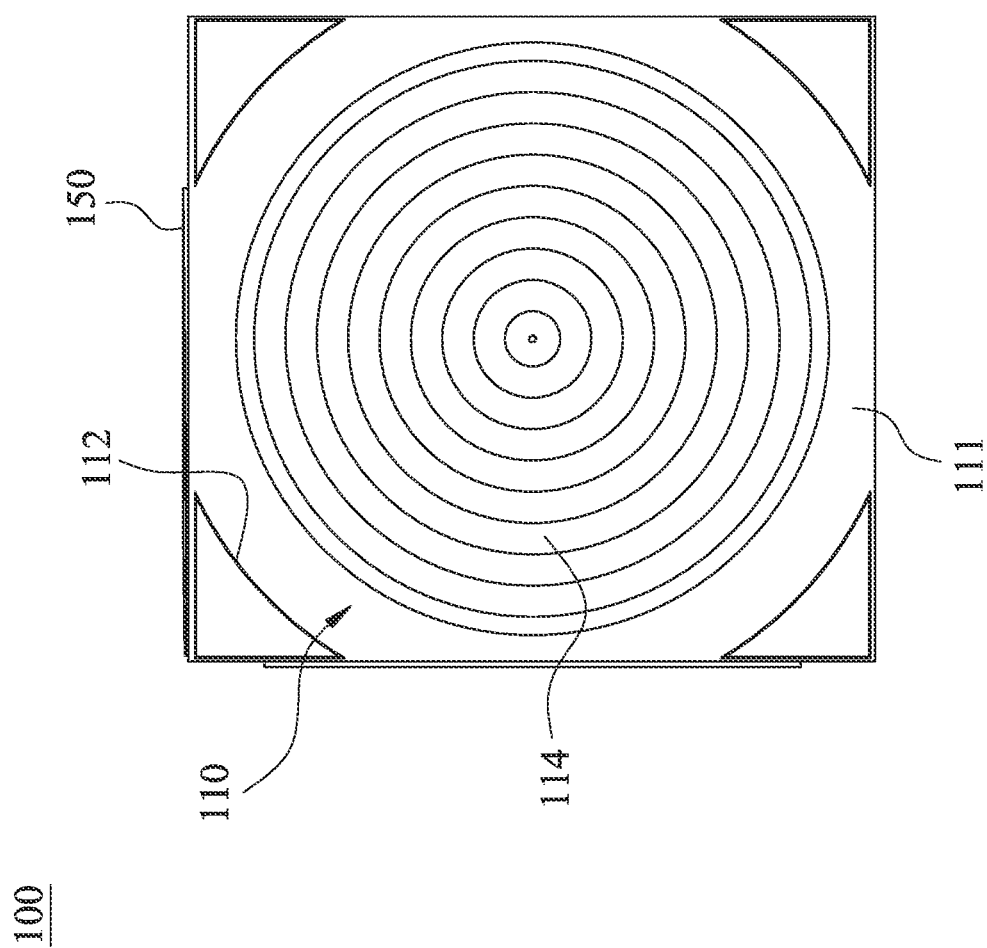

FIG. 1D is a schematic view of the incident surface 110 of the plastic light-folding element 100 according to the 1st example in FIG. 1A. In FIGS. 1A, 1B and 1D, the incident surface 110 includes an optical portion 111 and an arc step structure 112, the arc step structure 112 is disposed on a periphery of the optical portion 111, and an arc is formed by the arc step structure 112 centered on the optical portion 111, wherein the optical portion 111 includes an optical aspheric surface 114 located on a center of the optical portion 111. In particular, the plastic light-folding element 100 can have the optical refractive power, hence, the plastic light-folding element 100 is favorable for correcting the aberration to obtain the imaging quality with the high resolution. According to the 1st example, the arc step structure 112 includes a plurality of arcs, and the arcs are spaced apart from each other, wherein the arc step structure 112 is a concave step, and the concave step is that the optical portion 111 is lower than the periphery of the optical portion 111.

Figure 1E:
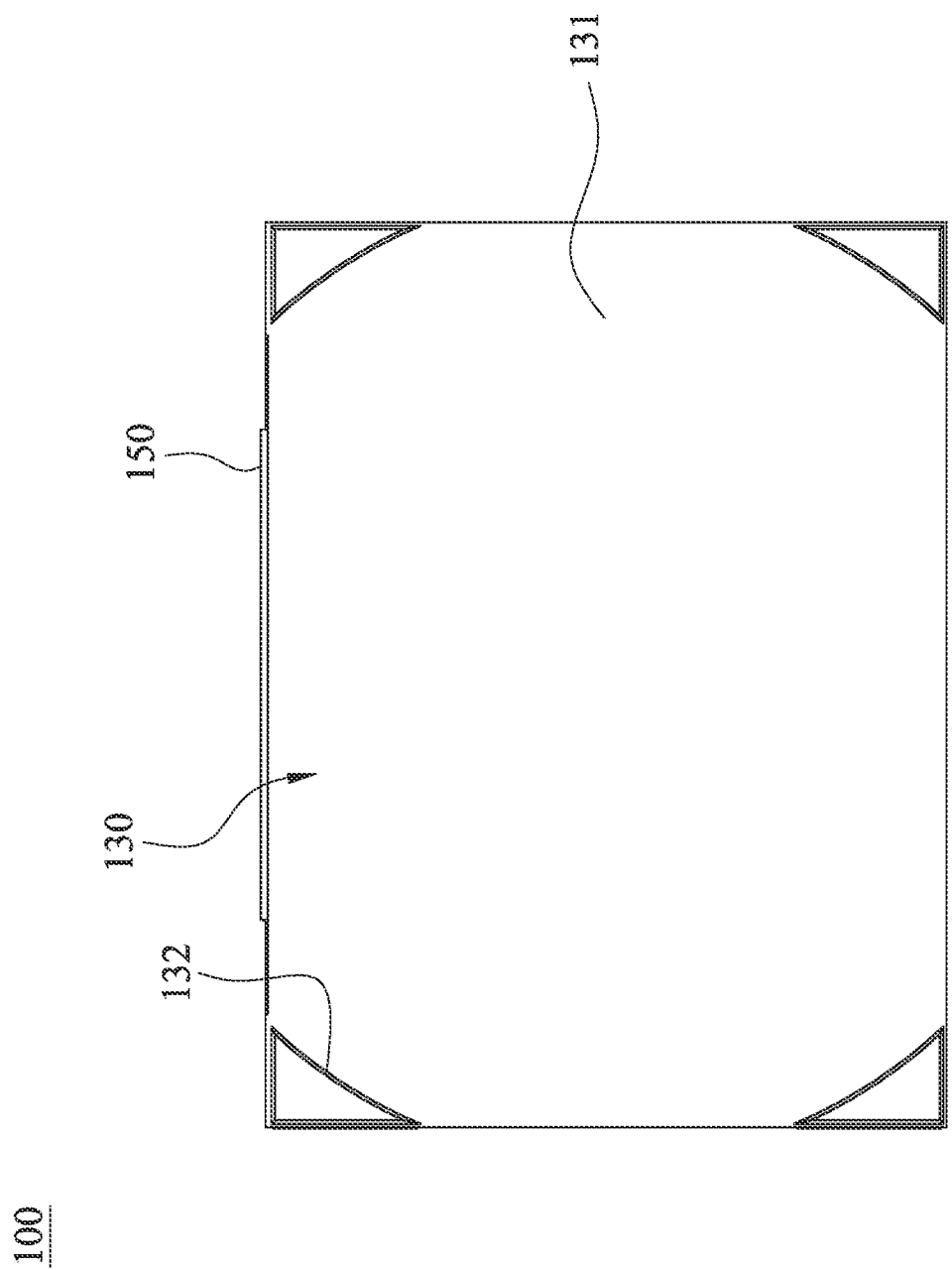

FIG. 1E is a schematic view of the reflective surface 130 of the plastic light-folding element 100 according to the 1st example in FIG. 1A. In FIGS. 1A, 1C and 1E, the reflective surface 130 includes an optical portion 131 and an arc step structure 132, the arc step structure 132 is disposed on a periphery of the optical portion 131, and an arc is formed by the arc step structure 132 centered on the optical portion 131, wherein the optical portion 131 includes a smooth surface. Therefore, the better flatness of the reflective surface 130 can be provided. According to the 1st example, the arc step structure 132 includes a plurality of arcs, and the arcs are spaced apart from each other, wherein the arc step structure 132 is a concave step, and the concave step is that the optical portion 131 is lower than the periphery of the optical portion 131.

FIG. 1F is a schematic view of the exit surface 120 of the plastic light-folding element 100 according to the 1st example in FIG. 1A. In FIGS. 1A, 1B and 1F, the exit surface 120 includes an optical portion 121 and an arc step structure 122, the arc step structure 122 is disposed on a periphery of the optical portion 121, and an arc is formed by the arc step structure 122 centered on the optical portion 121, wherein the optical portion 121 includes a smooth surface. Therefore, the better flatness of the exit surface 120 can be provided. According to the 1st example, the arc step structure 122 is an entire circle, and the arc step structure 122 is a convex step, wherein the convex step is that the optical portion 121 is higher than the periphery of the optical portion 121.

In FIGS. 1D and 1F, the surface accuracy of the optical surfaces (that is, the incident surface 110, the exit surface 120 and the reflective surface 130) can be further controlled by the arc step structures 112, 122, 132 disposed on the optical surfaces to reduce the dimensional tolerance of the optical surfaces.

Figure 1G:
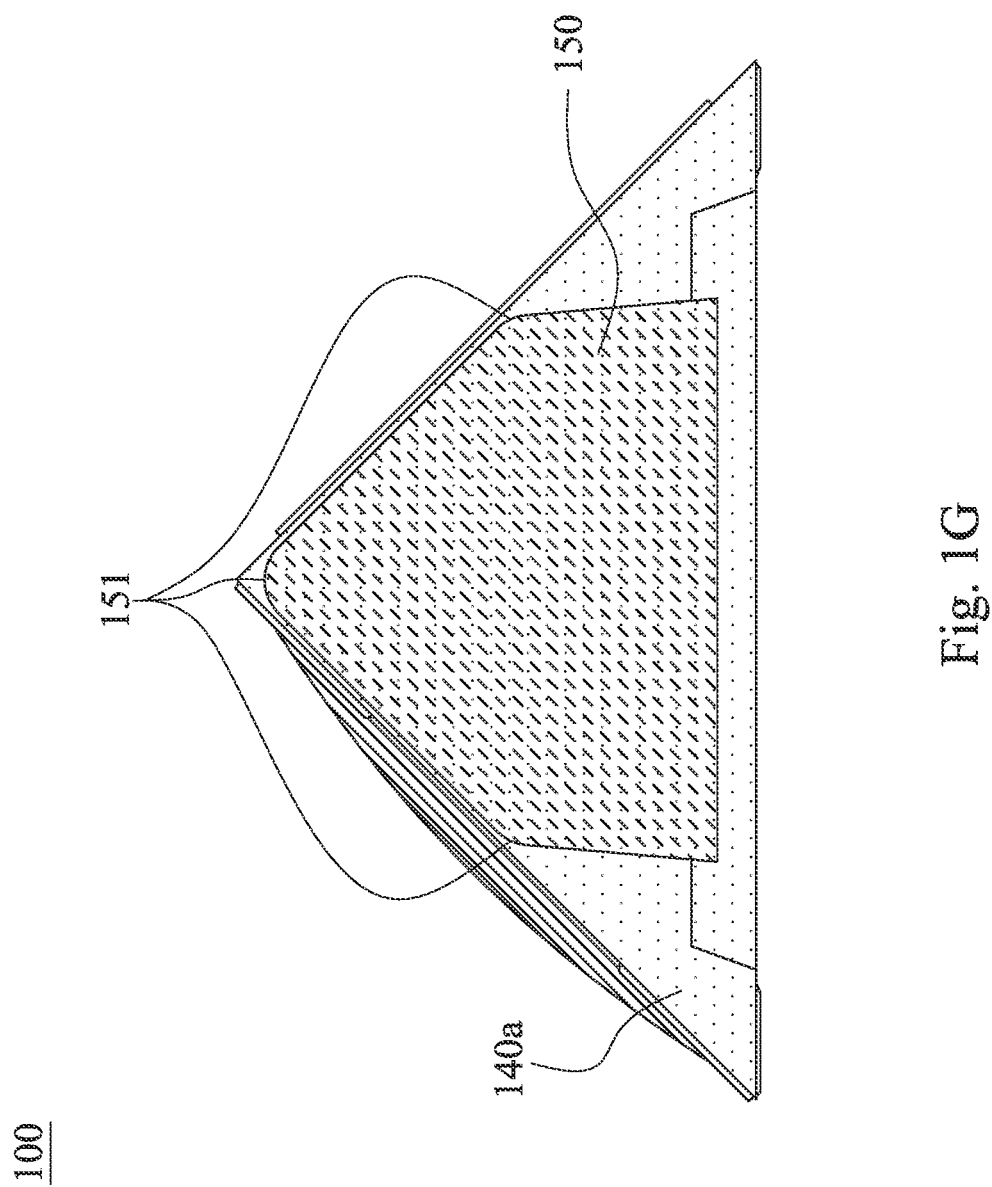

FIG. 1G is a schematic view of the parameters of the plastic light-folding element 100 according to the 1st example in FIG. 1A. In FIGS. 1B and 1G, the shape of the gate vestige structure 150 is polygon, but the present disclosure is not limited thereto. Further, the surface characteristic of the gate vestige structure 150 is different from the surface characteristic of the connecting surface 140a without the gate vestige structure.

In FIG. 1G, the gate vestige structure 150 includes an arc rim 151 extending from a center of the gate vestige structure 150 towards an outer side of the gate vestige structure 150. Therefore, the gate vestige structure 150 can have the stable and fast injection rate to provide the feasibility of the mass production. According to the 1st example, a number of the arc rim 151 is three, but the number is not limited thereto.

In FIGS. 1A and 1G, when an area of the gate vestige structure 150 on the connecting surface 140a is Ag, a total area of the connecting surface 140a is At, a step height of each of the arc step structures 112, 122, 132 is h, and an abbe number of the plastic light-folding element 100 is V, the following conditions of the Table 1 are satisfied.

TABLE 1

| 1st example | | | |
|---|---|---|---|
| Ag (mm$^2$) | 10.8 | h (mm) (the arc step structure 112) | 0.05 |
| At (mm$^2$) | 16 | h (mm) (the arc step structure 122) | 0.05 |
| Ag/At (%) | 67.5 | h (mm) (the arc step structure 132) | 0.03 |
| V | 56 | | |

2nd Example

Figure 2A:
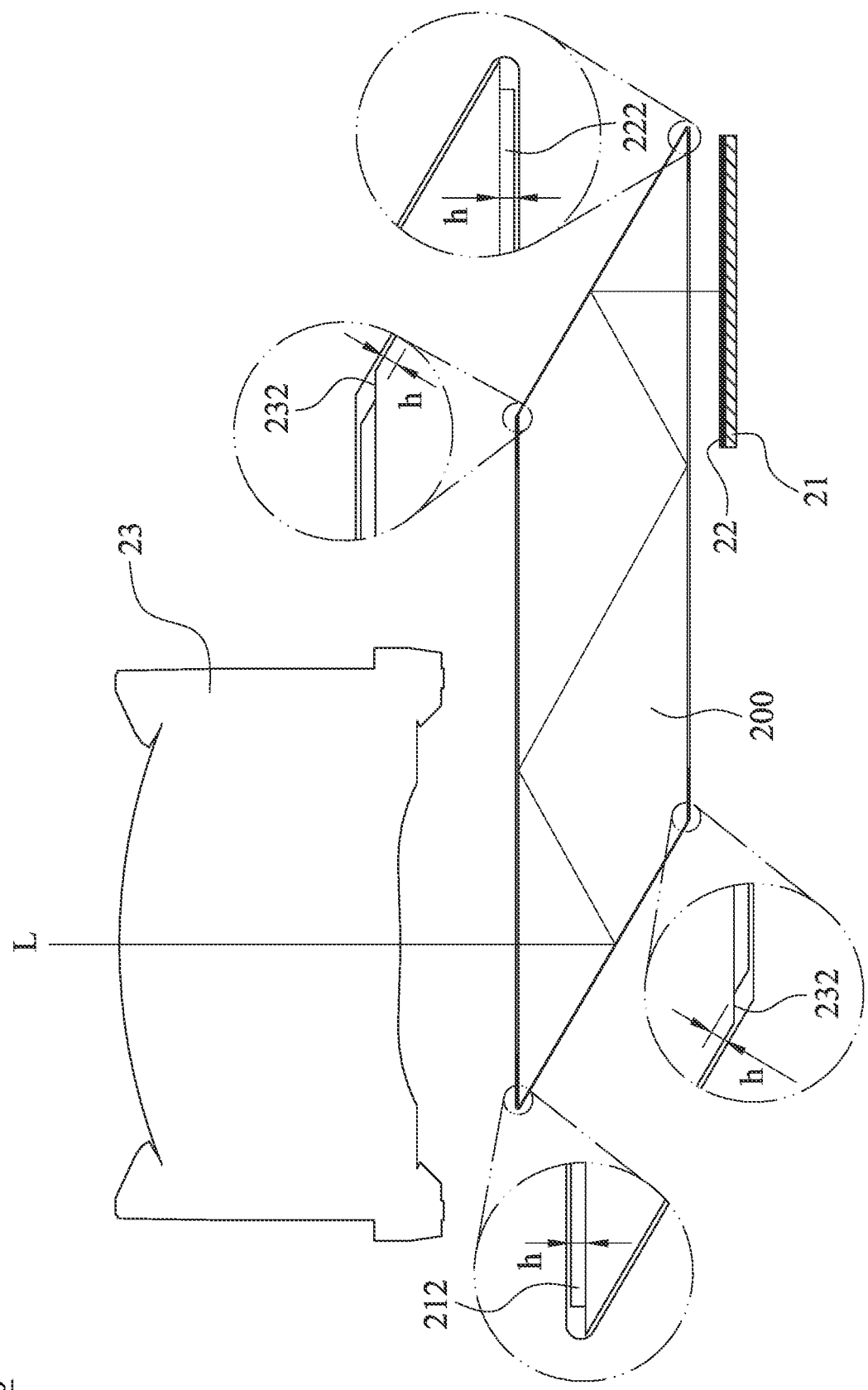
FIG. 2A is a schematic view of an electronic device according to the 2nd example of the present disclosure.

FIG. 2A is a schematic view of an electronic device 20 according to the 2nd example of the present disclosure. In FIG. 2A, the electronic device 20 includes an imaging lens assembly module (its reference numeral is omitted) and an image sensor 21, wherein the image sensor 21 is disposed on an image surface 22 of the imaging lens assembly module. Furthermore, the imaging lens assembly module includes a plastic light-folding element 200 and an imaging lens element set 23, wherein the plastic light-folding element 200 is disposed on one of an object side and an image side of the imaging lens element set 23. According to the 2nd example, the plastic light-folding element 200 is disposed on the image side of the imaging lens element set 23. In particular, the plastic light-folding element 200 is suitable for the telephoto imaging lens assembly module (that is, the full view is less than 40 degrees). Therefore, the volume of the imaging lens assembly module can be effectively reduced.

Figure 2B:
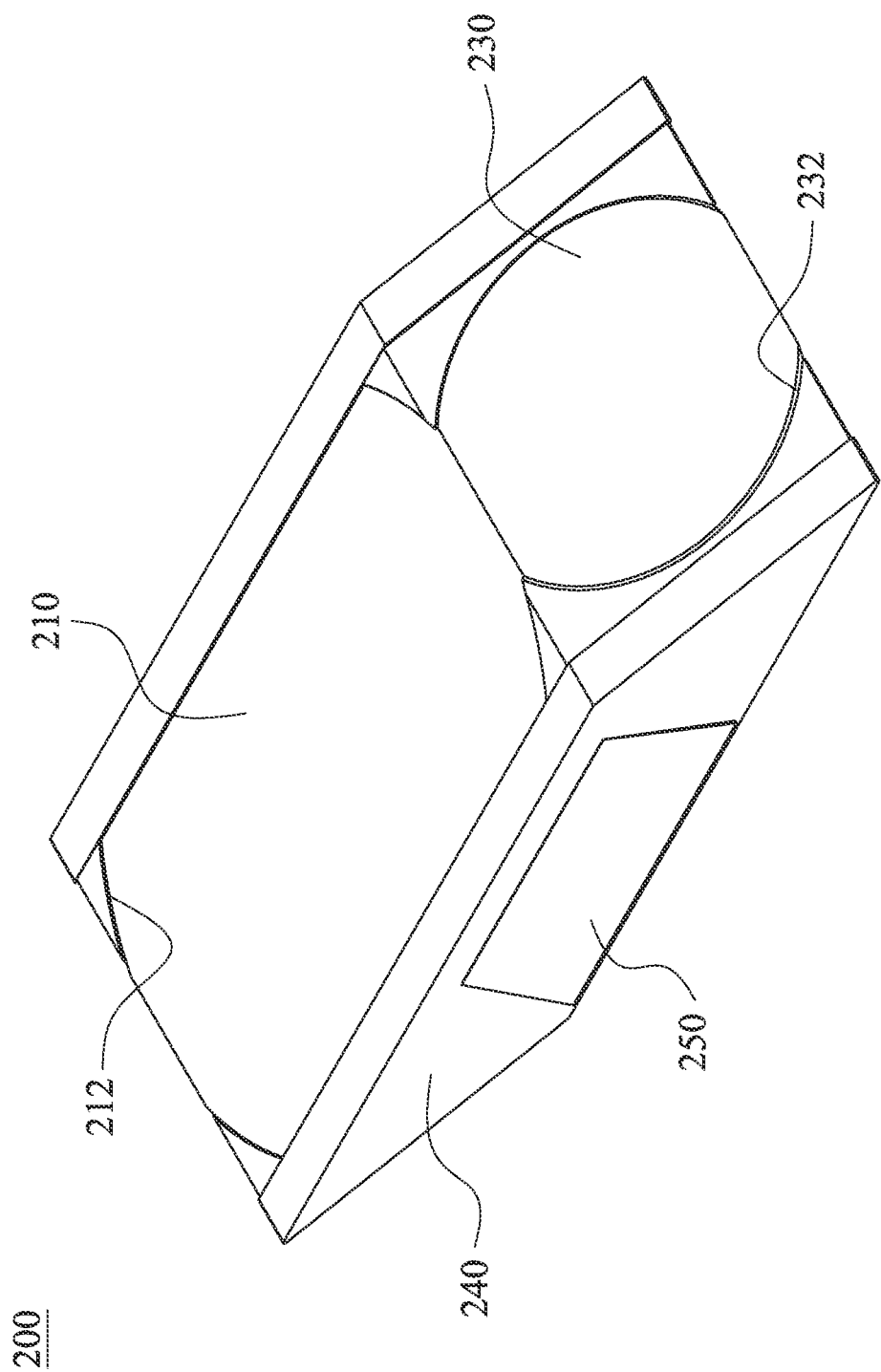
FIG. 2B is a three-dimensional view of the plastic light-folding element according to the 2nd example in FIG. 2A.
Figure 2C:
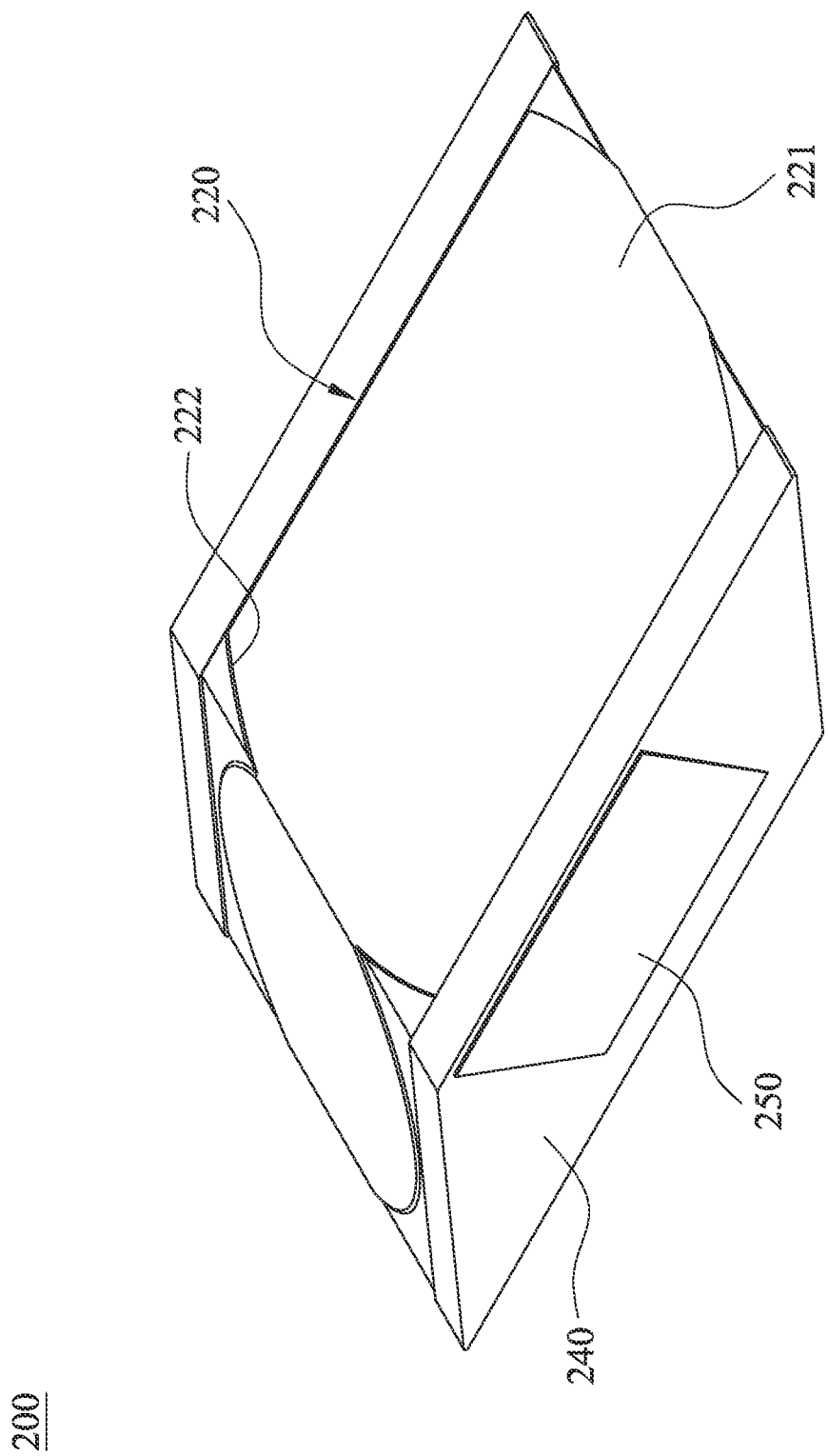
FIG. 2C is another three-dimensional view of the plastic light-folding element according to the 2nd example in FIG. 2A.

FIG. 2B is a three-dimensional view of the plastic light-folding element 200 according to the 2nd example in FIG. 2A. FIG. 2C is another three-dimensional view of the plastic light-folding element 200 according to the 2nd example in FIG. 2A. In FIGS. 2B and 2C, the plastic light-folding element 200 includes an incident surface 210, an exit surface 220, reflective surfaces 230, connecting surfaces 240 and gate vestige structures 250. The incident surface 210 is configured to lead an imaging light L enter the plastic light-folding element 200. The exit surface 220 is configured to lead the imaging light L exit the plastic light-folding element 200. The reflective surfaces 230 are configured to fold the imaging light L. Both of the connecting surfaces 240 are connected to the incident surface 210, the exit surface 220 and the reflective surfaces 230. The gate vestige structures 250 are disposed on the connecting surfaces 240, respectively. According to the 2nd example, a number of the reflective surfaces is four, a number of the connecting surfaces is two, a number of the gate vestige structures is two, wherein one of the reflective surfaces 230 and the incident surface 210 are located in the common plane, and another one of the reflective surfaces 230 and the exit surface 220 are located in the common plane, but the present disclosure is not limited thereto.

The plastic light-folding element 200 can be formed by the injection molding, the plastic light-folding element 200 includes a transparent plastic material, and the reflective surfaces 230 can be configured to reflect the imaging light L by the high reflective film or the total internal reflection. Moreover, all of the incident surface 210, the exit surface 220 and the reflective surfaces 230 can be the optical surfaces. In particular, by the gate vestige structures 250 with the high area ratio, the filling speed of the plastic material can be more stably controlled during the injection process of the plastic light-folding element 200. Therefore, the remaining of the flowing trace of the plastic material during the injection process can be avoided to reduce the defect.

In particular, the connecting surfaces 240 are correspondingly disposed, and the connecting surfaces 240 are essentially parallel to each other. Therefore, the complexity of the mold can be simplified to reduce the manufacturing cost of the product, and the entire light path is hardly skewed or deflected to lower the probability of the non-imaging light. Further, the connecting surfaces 240 are essentially orthogonal to the incident surface 210, the exit surface 220 and the reflective surfaces 230, respectively. Therefore, the aforementioned disposition is favorable for the structural design of the mold release.

Figure 2D:
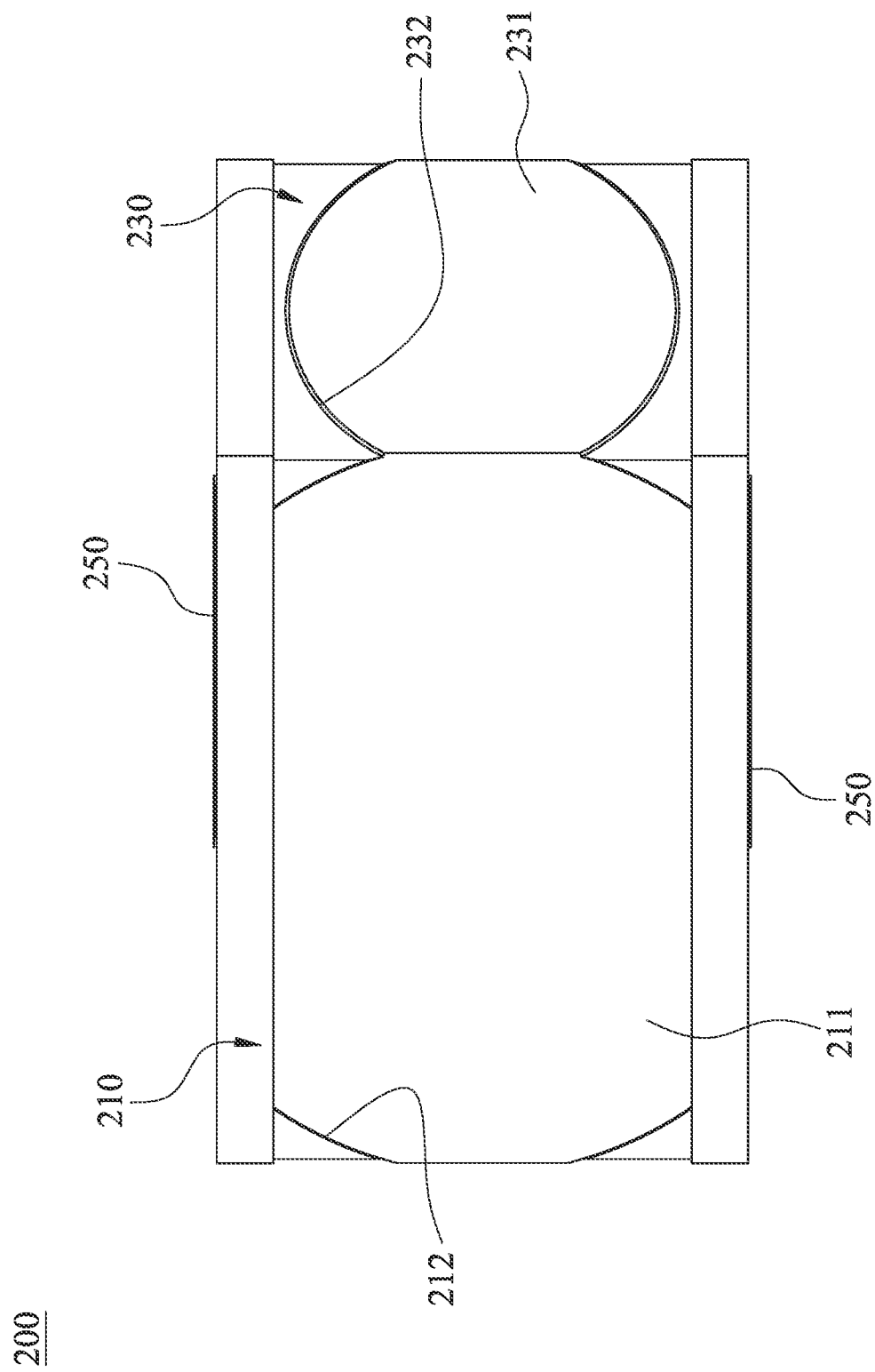
FIG. 2D is a schematic view of the incident surface and the reflective surface of the plastic light-folding element according to the 2nd example in FIG. 2A.

FIG. 2D is a schematic view of the incident surface 210 and the reflective surface 230 of the plastic light-folding element 200 according to the 2nd example in FIG. 2A. In FIGS. 2A, 2B and 2D, the incident surface 210 includes an optical portion 211 and an arc step structure 212, the arc step structure 212 is disposed on a periphery of the optical portion 211, and an arc is formed by the arc step structure 212 centered on the optical portion 211, wherein the optical portion 211 includes a smooth surface. Therefore, the better flatness of the incident surface 210 can be provided. According to the 2nd example, the arc step structure 212 includes a plurality of arcs, and the arcs are spaced apart from each other, wherein the arc step structure 212 is a concave step, and the concave step is that the optical portion 211 is lower than the periphery of the optical portion 211.

Each of the reflective surfaces 230 includes an optical portion 231 and an arc step structure 232, the arc step structure 232 is disposed on a periphery of the optical portion 231, and an arc is formed by the arc step structure 232 centered on the optical portion 231, wherein the optical portion 231 includes a smooth surface. Therefore, the better flatness of the reflective surfaces 230 can be provided. According to the 2nd example, the arc step structure 232 includes a plurality of arcs, and the arcs are spaced apart from each other, wherein the arc step structure 232 is a convex step, and the convex step is that the optical portion 231 is higher than the periphery of the optical portion 231.

Moreover, all of the reflective surfaces 230 are configured to fold the imaging light L. Therefore, the number of the reflective surfaces can be provided according to the optical requirements and the mechanical requirements, so that the suitable disposition of the light path can be obtained to achieve the compact size.

In FIGS. 2A and 2C, the exit surface 220 includes an optical portion 221 and an arc step structure 222, the arc step structure 222 is disposed on a periphery of the optical portion 221, and an arc is formed by the arc step structure 222 centered on the optical portion 221, wherein the optical portion 221 includes a smooth surface. Therefore, the better flatness of the exit surface 220 can be provided. According to the 2nd example, the arc step structure 222 includes a plurality of arcs, and the arcs are spaced apart from each other, wherein the arc step structure 222 is a concave step, and the concave step is that the optical portion 221 is lower than the periphery of the optical portion 221.

In FIGS. 2C and 2D, the surface accuracy of the optical surfaces (that is, the incident surface 210, the exit surface 220 and the reflective surfaces 230) can be further controlled by the arc step structures 212, 222, 232 disposed on the optical surfaces to reduce the dimensional tolerance of the optical surfaces.

Figure 2E:
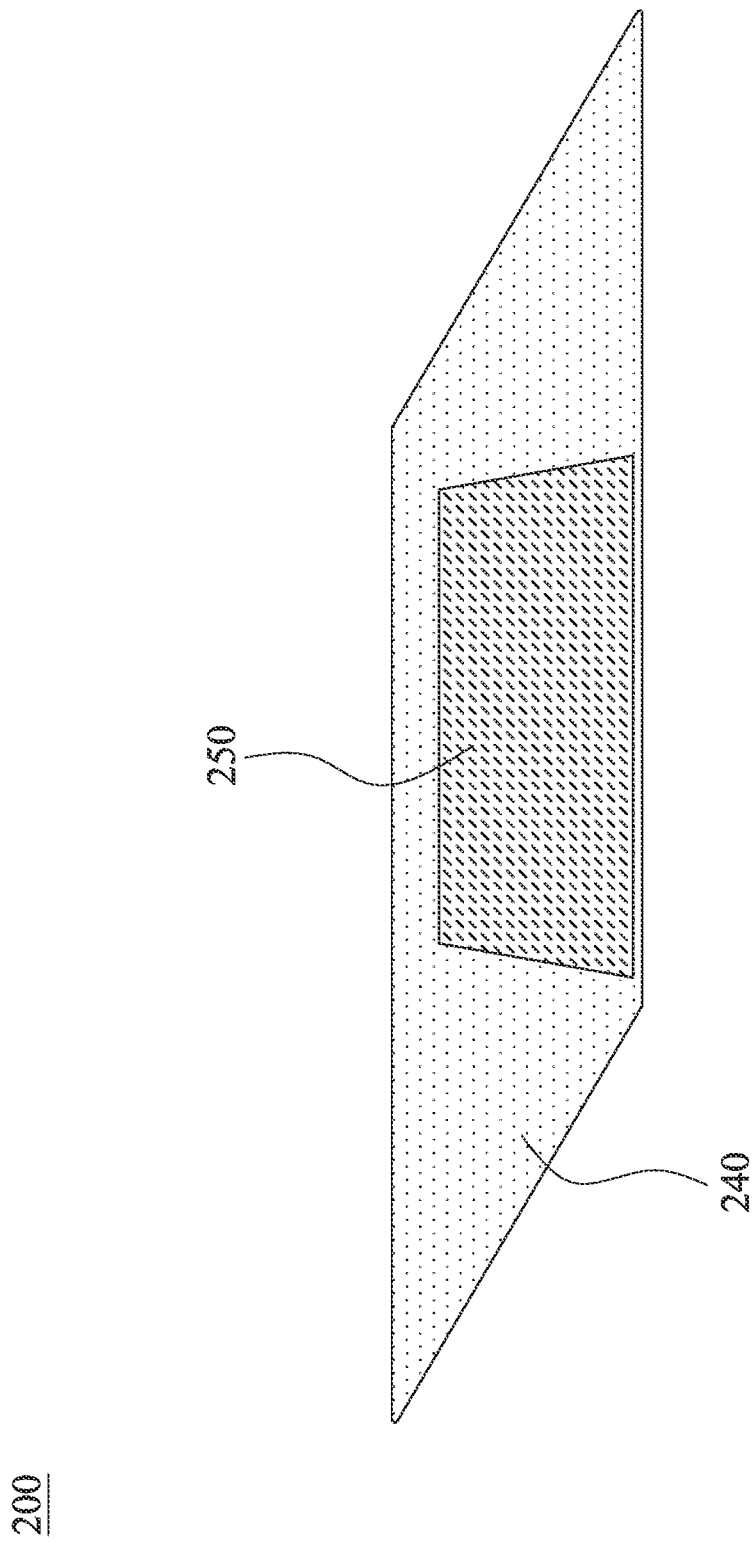
FIG. 2E is a schematic view of the parameters of the plastic light-folding element according to the 2nd example in FIG. 2A.

FIG. 2E is a schematic view of the parameters of the plastic light-folding element 200 according to the 2nd example in FIG. 2A. In FIGS. 2B, 2C and 2E, the shape of each of the gate vestige structures 250 is trapezoid, but the present disclosure is not limited thereto. Further, the surface characteristic of the gate vestige structures 250 is different from the surface characteristic of the connecting surfaces 240 without the gate vestige structure.

In FIGS. 2A and 2E, when an area of each of the gate vestige structures 250 on each of the connecting surfaces 240 is Ag, a total area of each of the connecting surfaces 240 is At, a step height of each of the arc step structures 212, 222, 232 is h, and an abbe number of the plastic light-folding element 200 is V, the following conditions of the Table 2 are satisfied.

TABLE 2

| 2nd example | | | |
|---|---|---|---|
| Ag (mm$^2$) | 10.87 | h (mm) (the arc step structure 212) | 0.03 |
| At (mm$^2$) | 17.92 | h (mm) (the arc step structure 222) | 0.03 |
| Ag/At (%) | 60.7 | h (mm) (the arc step structure 232) | 0.03 |
| V | 55 | | |

3rd Example

Figure 3A:
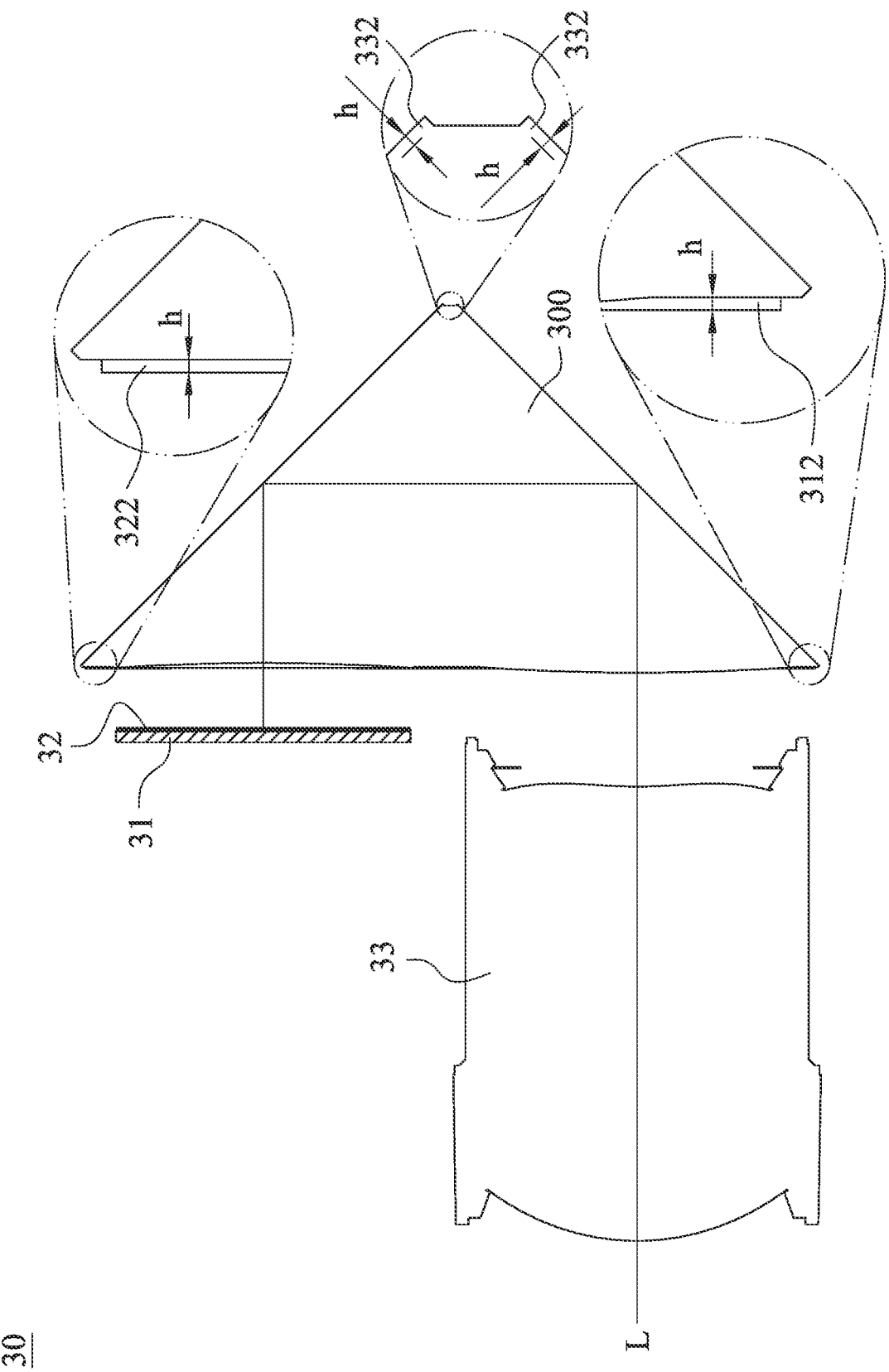
FIG. 3A is a schematic view of an electronic device according to the 3rd example of the present disclosure.

FIG. 3A is a schematic view of an electronic device 30 according to the 3rd example of the present disclosure. In FIG. 3A, the electronic device 30 includes an imaging lens assembly module (its reference numeral is omitted) and an image sensor 31, wherein the image sensor 31 is disposed on an image surface 32 of the imaging lens assembly module. Furthermore, the imaging lens assembly module includes a plastic light-folding element 300 and an imaging lens element set 33, wherein the plastic light-folding element 300 is disposed on one of an object side and an image side of the imaging lens element set 33. According to the 3rd example, the plastic light-folding element 300 is disposed on the image side of the imaging lens element set 33. In particular, the plastic light-folding element 300 is suitable for the telephoto imaging lens assembly module (that is, the full view is less than 40 degrees). Therefore, the volume of the imaging lens assembly module can be effectively reduced.

Figure 3B:
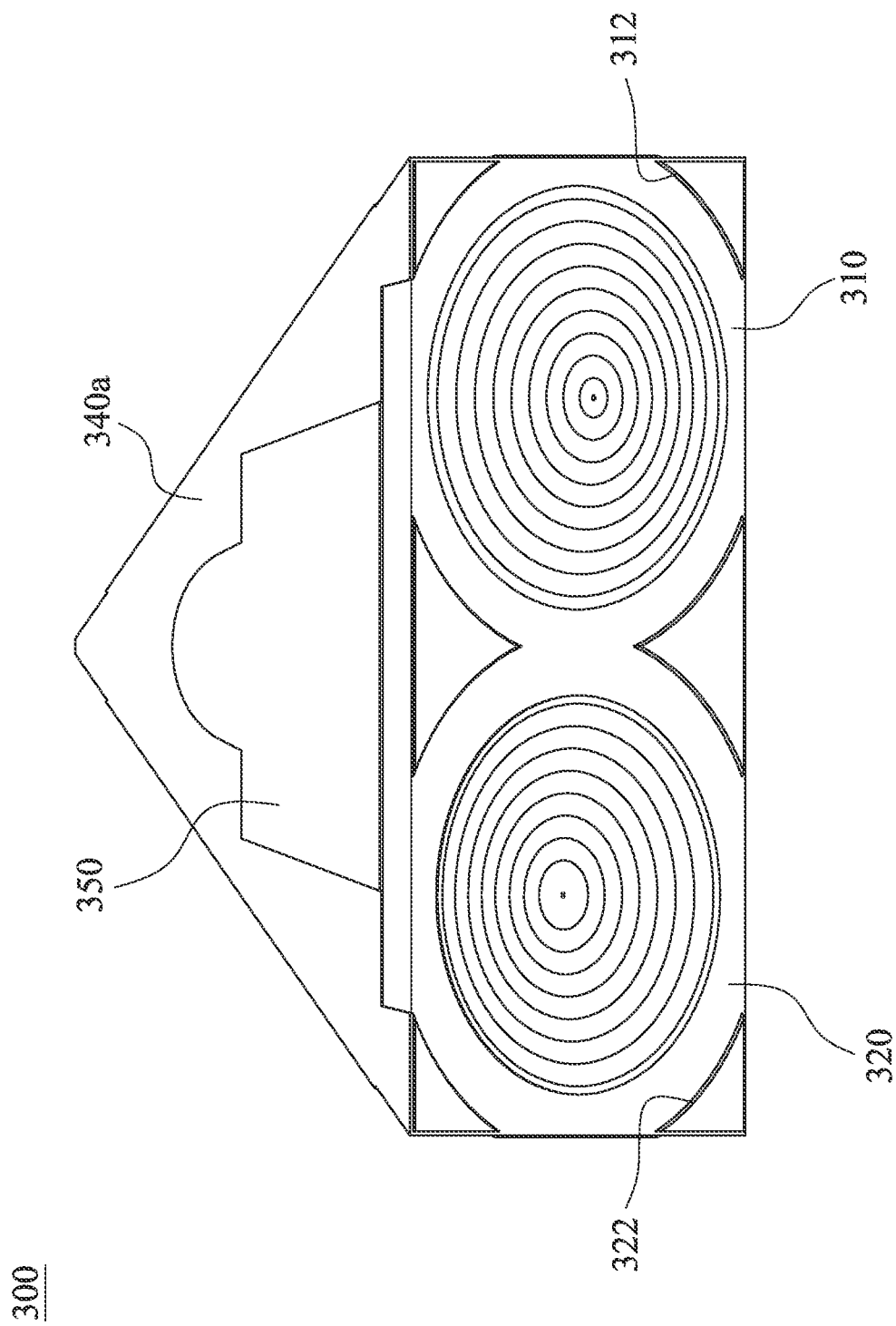
FIG. 3B is a three-dimensional view of the plastic light-folding element according to the 3rd example in FIG. 3A.

FIG. 3B is a three-dimensional view of the plastic light-folding element 300 according to the 3rd example in FIG. 3A. FIG. 3C is another three-dimensional view of the plastic light-folding element 300 according to the 3rd example in FIG. 3A. In FIGS. 3B and 3C, the plastic light-folding element 300 includes an incident surface 310, an exit surface 320, reflective surfaces 330, connecting surfaces 340a, 340b and at least one gate vestige structure 350. The incident surface 310 is configured to lead an imaging light L enter the plastic light-folding element 300. The exit surface 320 is configured to lead the imaging light L exit the plastic light-folding element 300. The reflective surfaces 330 are configured to fold the imaging light L. Both of the connecting surfaces 340a, 340b are connected to the incident surface 310, the exit surface 320 and the reflective surfaces 330. The gate vestige structure 350 is disposed on the connecting surface 340a. According to the 3rd example, a number of the reflective surfaces is two, a number of the connecting surfaces is two, a number of the gate vestige structure is one, wherein the incident surface 310 and the exit surface 320 are located in the common plane, but the present disclosure is not limited thereto.

The plastic light-folding element 300 can be formed by the injection molding, the plastic light-folding element 300 includes a transparent plastic material, and the reflective surfaces 330 can be configured to reflect the imaging light L by the high reflective film or the total internal reflection. Moreover, all of the incident surface 310, the exit surface 320 and the reflective surfaces 330 can be the optical surfaces. In particular, by the gate vestige structure 350 with the high area ratio, the filling speed of the plastic material can be more stably controlled during the injection process of the plastic light-folding element 300. Therefore, the remaining of the flowing trace of the plastic material during the injection process can be avoided to reduce the defect.

In particular, the connecting surfaces 340a, 340b are correspondingly disposed, and the connecting surfaces 340a, 340b are essentially parallel to each other. Therefore, the complexity of the mold can be simplified to reduce the manufacturing cost of the product, and the entire light path is hardly skewed or deflected to lower the probability of the non-imaging light. Further, the connecting surfaces 340a, 340b are essentially orthogonal to the incident surface 310, the exit surface 320 and the reflective surfaces 330, respectively. Therefore, the aforementioned disposition is favorable for the structural design of the mold release.

Figure 3D:
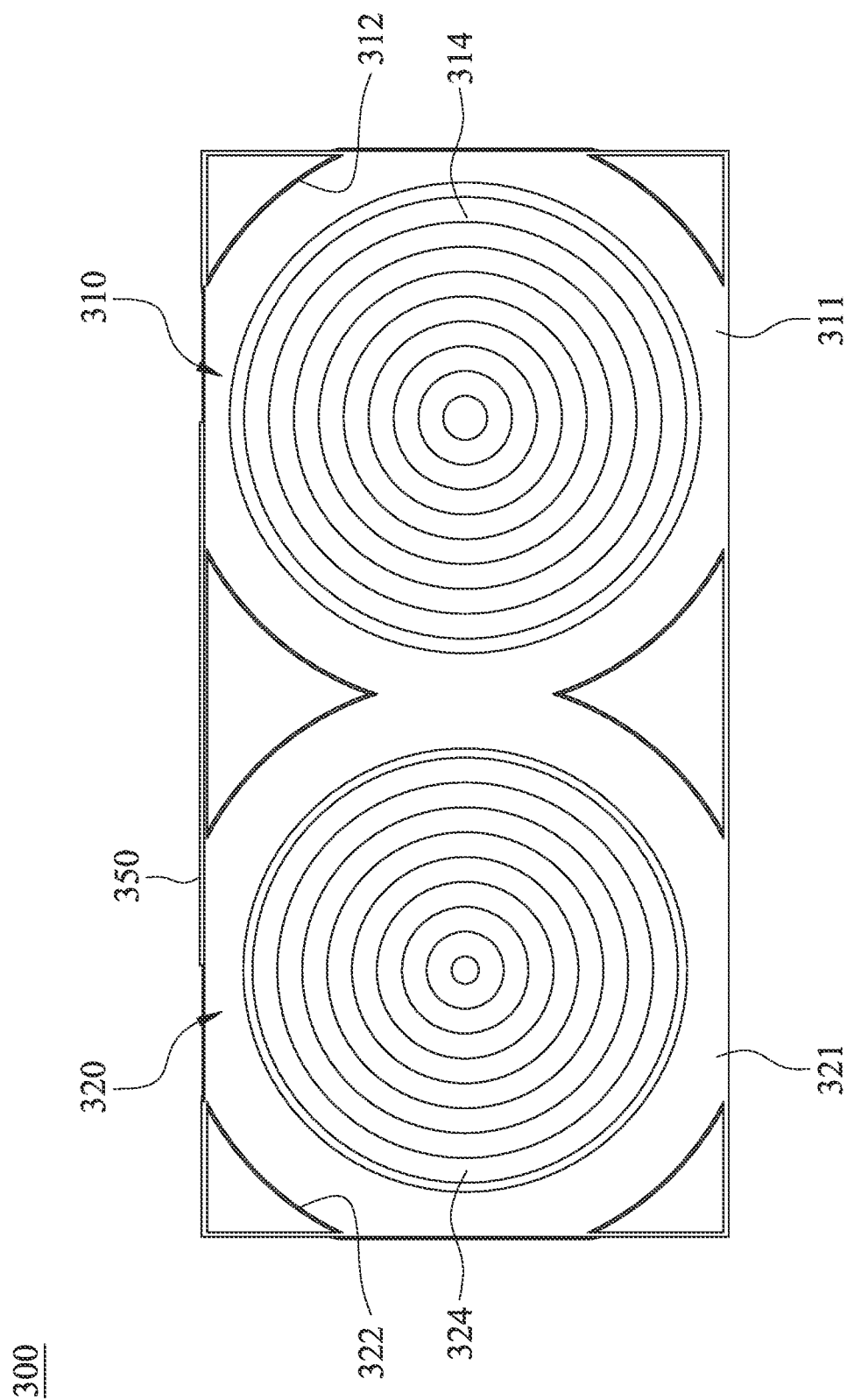
FIG. 3D is a schematic view of the incident surface and the exit surface of the plastic light-folding element according to the 3rd example in FIG. 3A.

FIG. 3D is a schematic view of the incident surface 310 and the exit surface 320 of the plastic light-folding element 300 according to the 3rd example in FIG. 3A. In FIGS. 3A, 3B and 3D, the incident surface 310 includes an optical portion 311 and an arc step structure 312, the arc step structure 312 is disposed on a periphery of the optical portion 311, and an arc is formed by the arc step structure 312 centered on the optical portion 311, wherein the optical portion 311 includes an optical aspheric surface 314 located on a center of the optical portion 311. In particular, the plastic light-folding element 300 can have the optical refractive power, hence, the plastic light-folding element 300 is favorable for correcting the aberration to obtain the imaging quality with the high resolution. According to the 3rd example, the arc step structure 312 includes a plurality of arcs, and the arcs are spaced apart from each other, wherein the arc step structure 312 is a concave step, and the concave step is that the optical portion 311 is lower than the periphery of the optical portion 311.

Figure 3E:
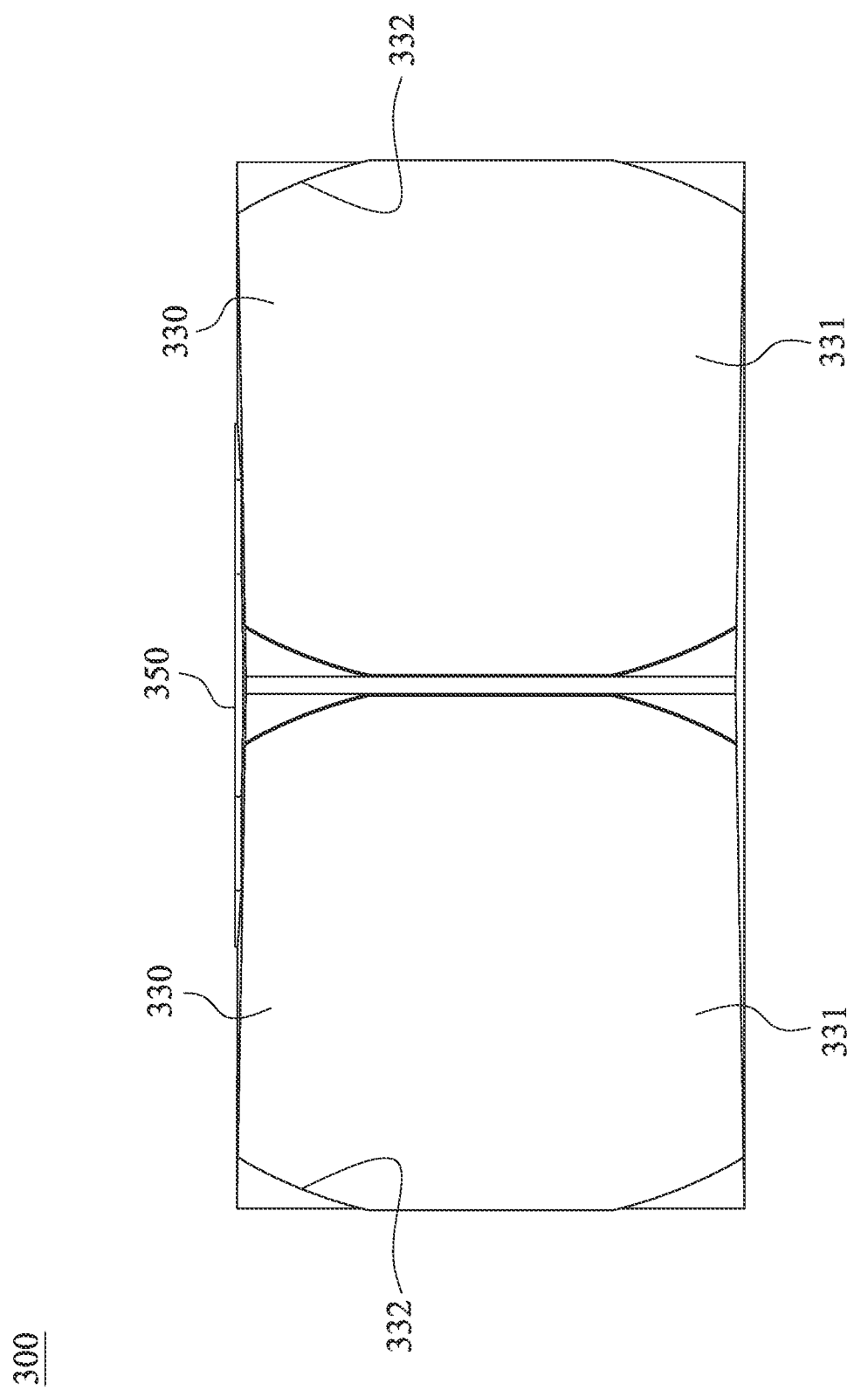
FIG. 3E is a schematic view of the reflective surfaces of the plastic light-folding element according to the 3rd example in FIG. 3A.

FIG. 3E is a schematic view of the reflective surfaces 330 of the plastic light-folding element 300 according to the 3rd example in FIG. 3A. In FIGS. 3A and 3E, each of the reflective surfaces 330 includes an optical portion 331 and an arc step structure 332, the arc step structure 332 is disposed on a periphery of the optical portion 331, and an arc is formed by the arc step structure 332 centered on the optical portion 331, wherein the optical portion 331 includes a smooth surface. Therefore, the better flatness of the reflective surfaces 330 can be provided. According to the 3rd example, the arc step structure 332 includes a plurality of arcs, and the arcs are spaced apart from each other, wherein the arc step structure 332 is a convex step, and the convex step is that the optical portion 331 is higher than the periphery of the optical portion 331.

Moreover, all of the reflective surfaces 330 are configured to fold the imaging light L. Therefore, the number of the reflective surfaces can be provided according to the optical requirements and the mechanical requirements, so that the suitable disposition of the light path can be obtained to achieve the compact size. Further, the reflective surfaces 330 are essentially orthogonal to each other. Therefore, the light path of the focus driving distance can be shortened.

In FIGS. 3A, 3B and 3D, the exit surface 320 includes an optical portion 321 and an arc step structure 322, the arc step structure 322 is disposed on a periphery of the optical portion 321, and an arc is formed by the arc step structure 322 centered on the optical portion 321, wherein the optical portion 321 includes an optical aspheric surface 324 located on a center of the optical portion 321. In particular, the plastic light-folding element 300 can have the optical refractive power, hence, the plastic light-folding element 300 is favorable for correcting the aberration to obtain the imaging quality with the high resolution. According to the 3rd example, the arc step structure 322 includes a plurality of arcs, and the arcs are spaced apart from each other, wherein the arc step structure 322 is a concave step, and the concave step is that the optical portion 321 is lower than the periphery of the optical portion 321.

In FIGS. 3D and 3E, the surface accuracy of the optical surfaces (that is, the incident surface 310, the exit surface 320 and the reflective surfaces 330) can be further controlled by the arc step structures 312, 322, 332 disposed on the optical surfaces to reduce the dimensional tolerance of the optical surfaces.

Figure 3F:
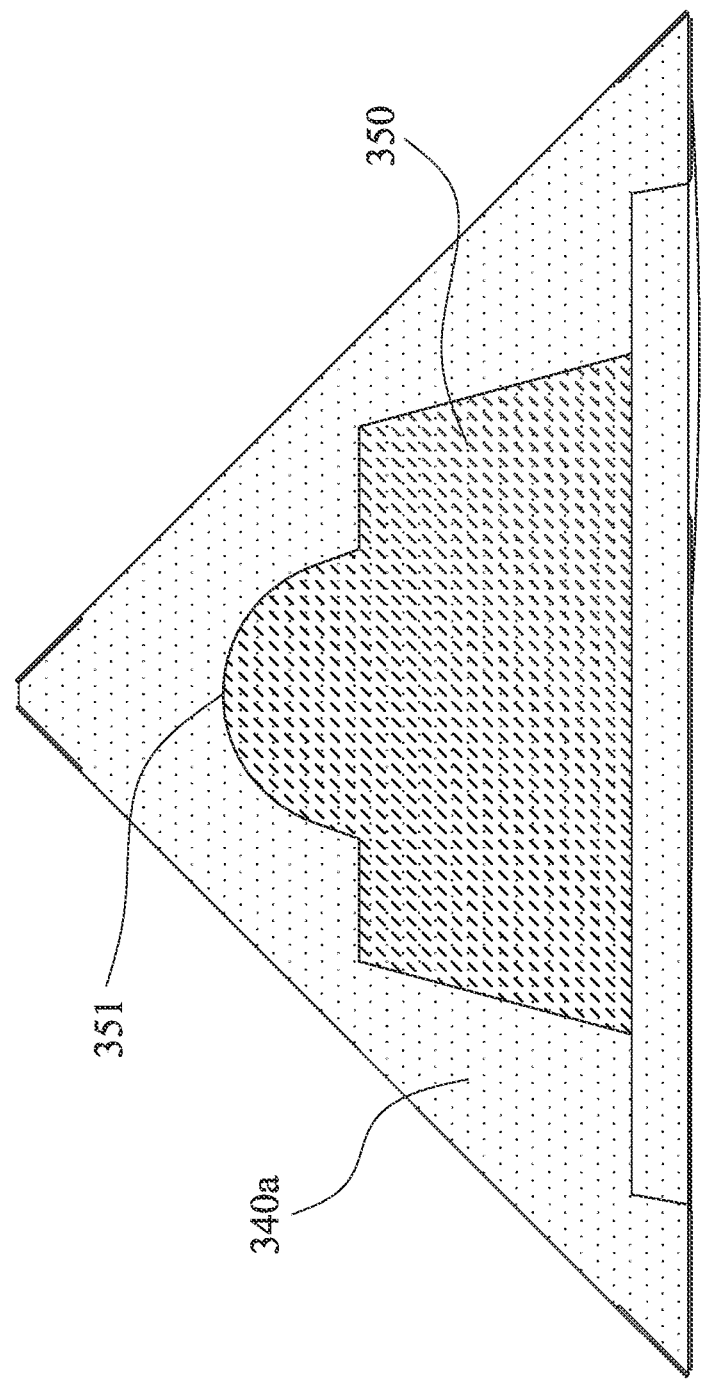
FIG. 3F is a schematic view of the parameters of the plastic light-folding element according to the 3rd example in FIG. 3A.

FIG. 3F is a schematic view of the parameters of the plastic light-folding element 300 according to the 3rd example in FIG. 3A. In FIGS. 3B and 3F, the shape of the gate vestige structure 350 is a combination of trapezoid and semicircle, but the present disclosure is not limited thereto. Further, the surface characteristic of the gate vestige structure 350 is different from the surface characteristic of the connecting surface 340a without the gate vestige structure.

In FIG. 3F, the gate vestige structure 350 includes an arc rim 351 extending from a center of the gate vestige structure 350 towards an outer side of the gate vestige structure 350. Therefore, the gate vestige structure 350 can have the stable and fast injection rate to provide the feasibility of the mass production. According to the 3rd example, a number of the arc rim 351 is one, but the number is not limited thereto.

In FIGS. 3A and 3F, when an area of the gate vestige structure 350 on the connecting surface 340a is Ag, a total area of the connecting surface 340a is At, a step height of each of the arc step structures 312, 322, 332 is h, and an abbe number of the plastic light-folding element 300 is V, the following conditions of the Table 3 are satisfied.

TABLE 3

| 3rd example | | | |
|---|---|---|---|
| Ag (mm$^2$) | 15.14 | h (mm)<br>(the arc step structure 312) | 0.03 |
| At (mm$^2$) | 36.39 | h (mm)<br>(the arc step structure 322) | 0.03 |
| Ag/At (%) | 41.6 | h (mm)<br>(the arc step structure 332) | 0.03 |
| V | 64.2 | | |

4th Example

Figure 4A:
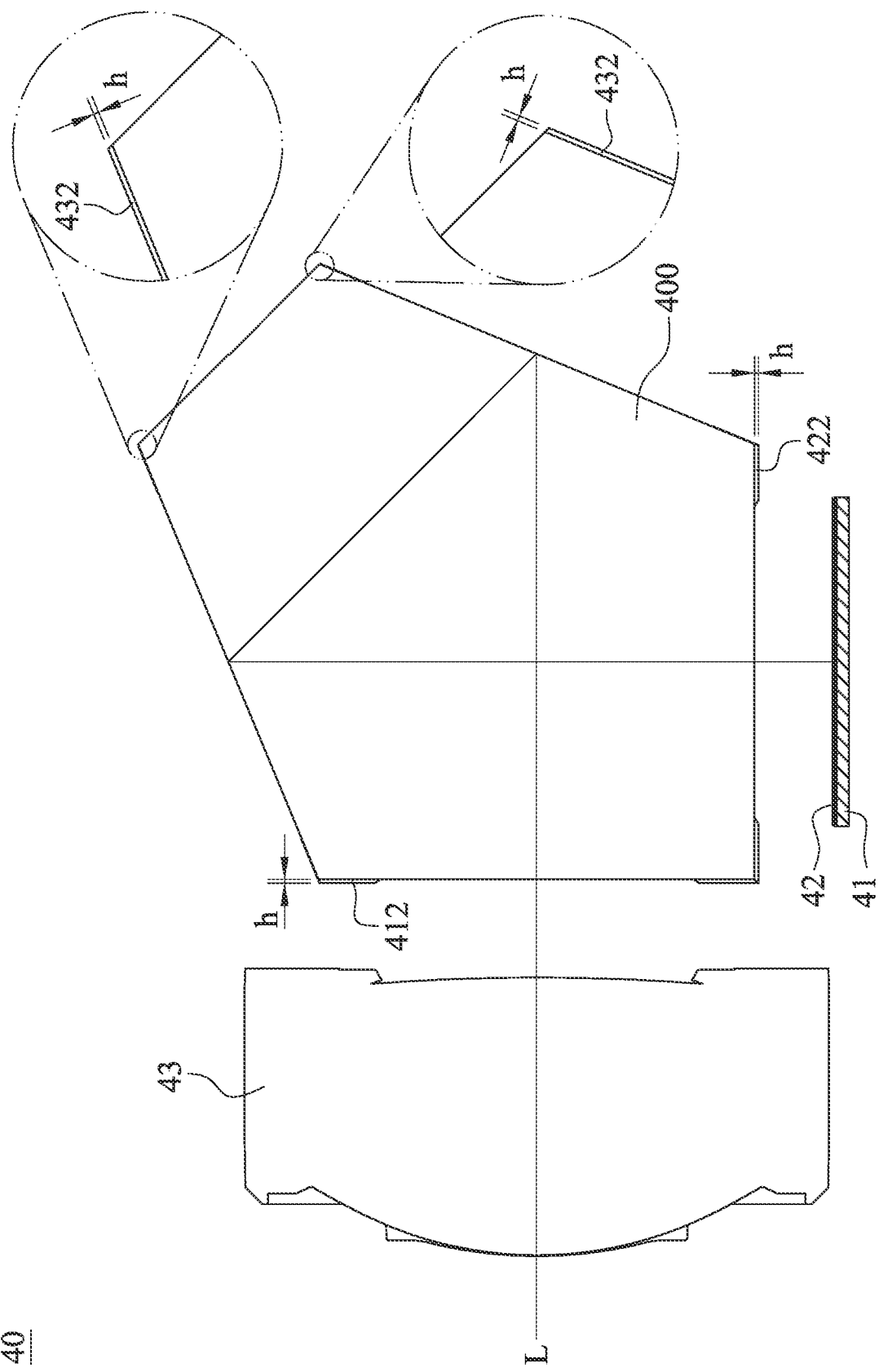
FIG. 4A is a schematic view of an electronic device according to the 4th example of the present disclosure.

FIG. 4A is a schematic view of an electronic device 40 according to the 4th example of the present disclosure. In FIG. 4A, the electronic device 40 includes an imaging lens assembly module (its reference numeral is omitted) and an image sensor 41, wherein the image sensor 41 is disposed on an image surface 42 of the imaging lens assembly module. Furthermore, the imaging lens assembly module includes a plastic light-folding element 400 and an imaging lens element set 43, wherein the plastic light-folding element 400 is disposed on one of an object side and an image side of the imaging lens element set 43. According to the 4th example, the plastic light-folding element 400 is disposed on the image side of the imaging lens element set 43. In particular, the plastic light-folding element 400 is suitable for the telephoto imaging lens assembly module (that is, the full view is less than 40 degrees). Therefore, the volume of the imaging lens assembly module can be effectively reduced.

Figure 4B:
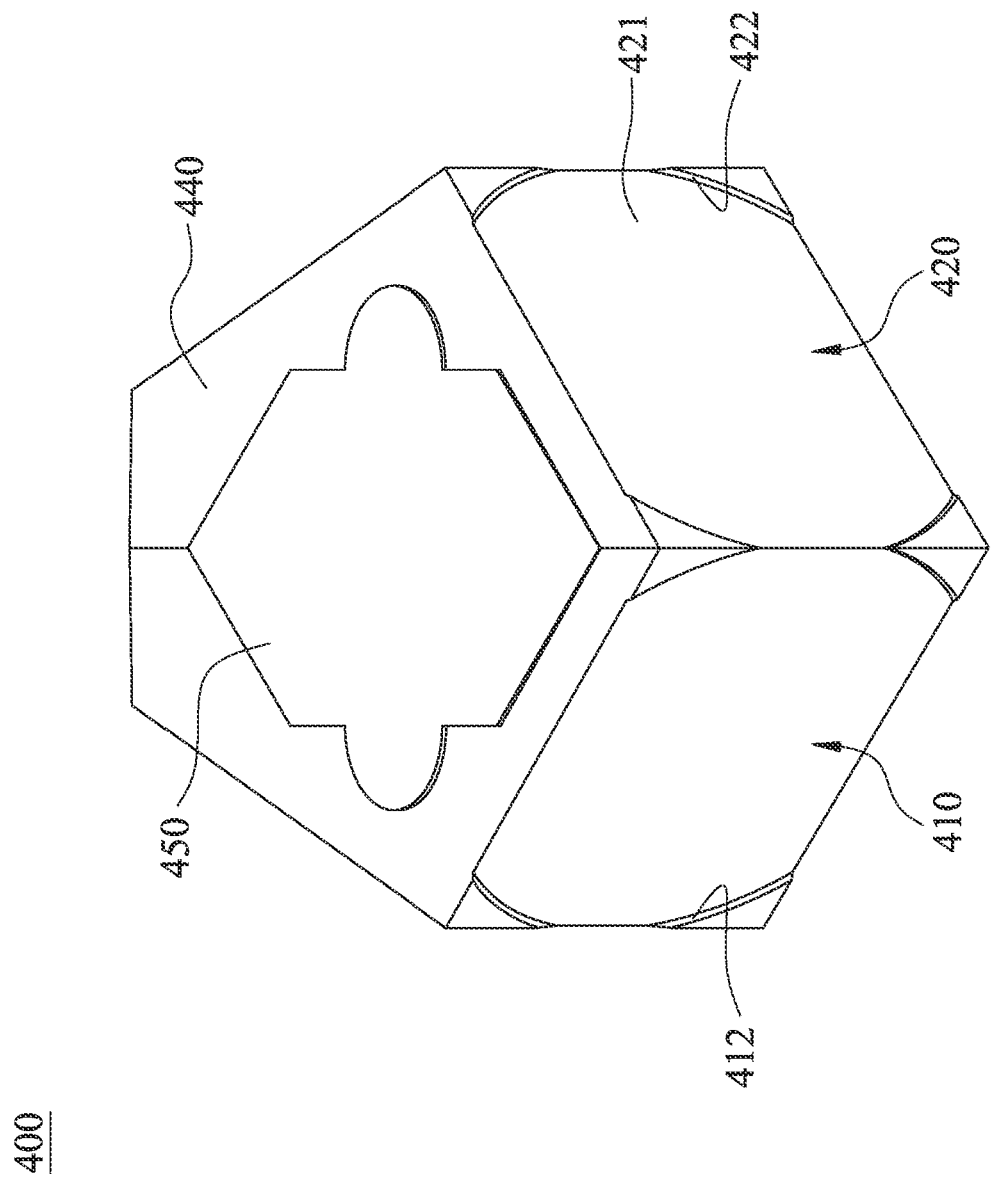
FIG. 4B is a three-dimensional view of the plastic light-folding element according to the 4th example in FIG. 4A.
Figure 4C:
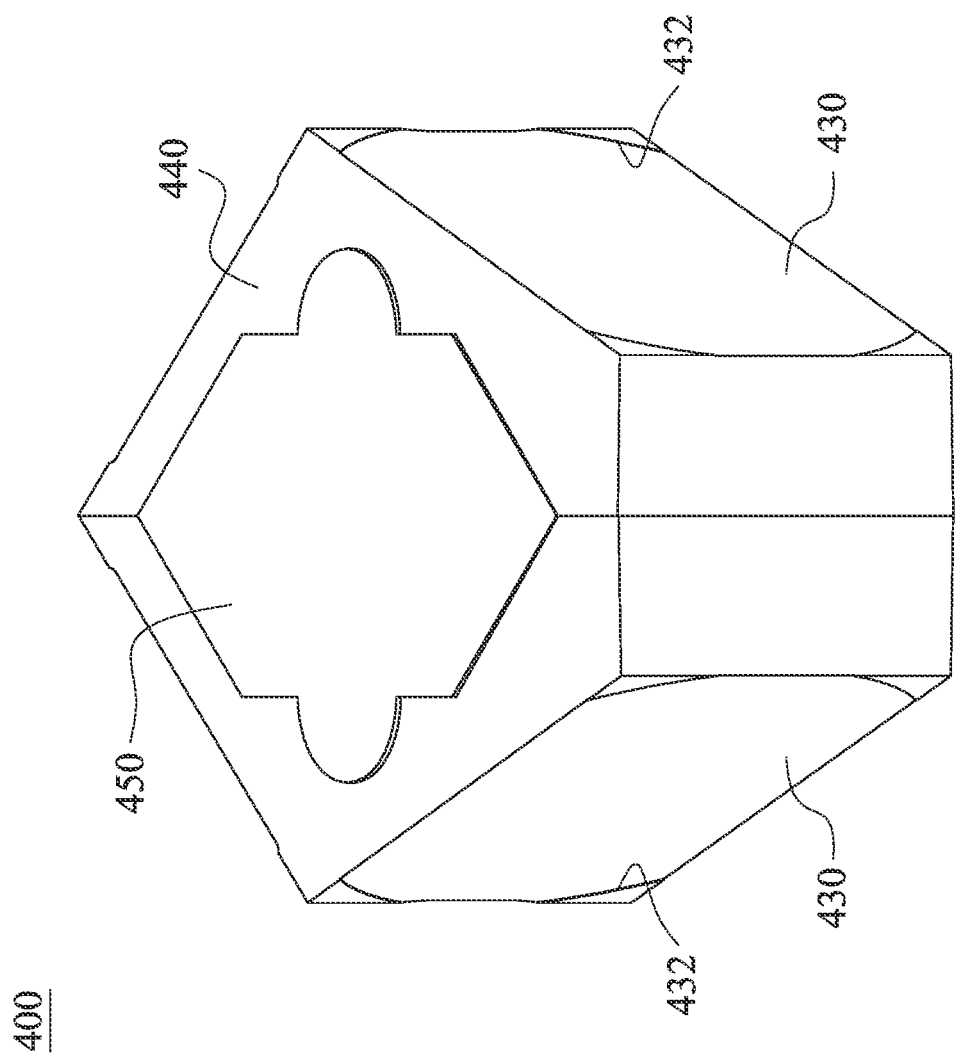
FIG. 4C is another three-dimensional view of the plastic light-folding element according to the 4th example in FIG. 4A.

FIG. 4B is a three-dimensional view of the plastic light-folding element 400 according to the 4th example in FIG. 4A. FIG. 4C is another three-dimensional view of the plastic light-folding element 400 according to the 4th example in FIG. 4A. In FIGS. 4B and 4C, the plastic light-folding element 400 includes an incident surface 410, an exit surface 420, reflective surfaces 430, connecting surfaces 440 and gate vestige structures 450. The incident surface 410 is configured to lead an imaging light L enter the plastic light-folding element 400. The exit surface 420 is configured to lead the imaging light L exit the plastic light-folding element 400. The reflective surfaces 430 are configured to fold the imaging light L. Both of the connecting surfaces 440 are connected to the incident surface 410, the exit surface 420 and the reflective surfaces 430. The gate vestige structures 450 are disposed on the connecting surface 440, respectively. According to the 4th example, a number of the reflective surfaces is two, a number of the connecting surfaces is two, a number of the gate vestige structures is two, but the present disclosure is not limited thereto.

The plastic light-folding element 400 can be formed by the injection molding, the plastic light-folding element 400 includes a transparent plastic material, and the reflective surfaces 430 can be configured to reflect the imaging light L by the high reflective film or the total internal reflection. Moreover, all of the incident surface 410, the exit surface 420 and the reflective surfaces 430 can be the optical surfaces. In particular, by the gate vestige structures 450 with the high area ratio, the filling speed of the plastic material can be more stably controlled during the injection process of the plastic light-folding element 400. Therefore, the remaining of the flowing trace of the plastic material during the injection process can be avoided to reduce the defect.

In particular, the connecting surfaces 440 are correspondingly disposed, and the connecting surfaces 440 are essentially parallel to each other. Therefore, the complexity of the mold can be simplified to reduce the manufacturing cost of the product, and the entire light path is hardly skewed or deflected to lower the probability of the non-imaging light. Further, the connecting surfaces 440 are essentially orthogonal to the incident surface 410, the exit surface 420 and the reflective surfaces 430, respectively. Therefore, the aforementioned disposition is favorable for the structural design of the mold release.

Figure 4D:
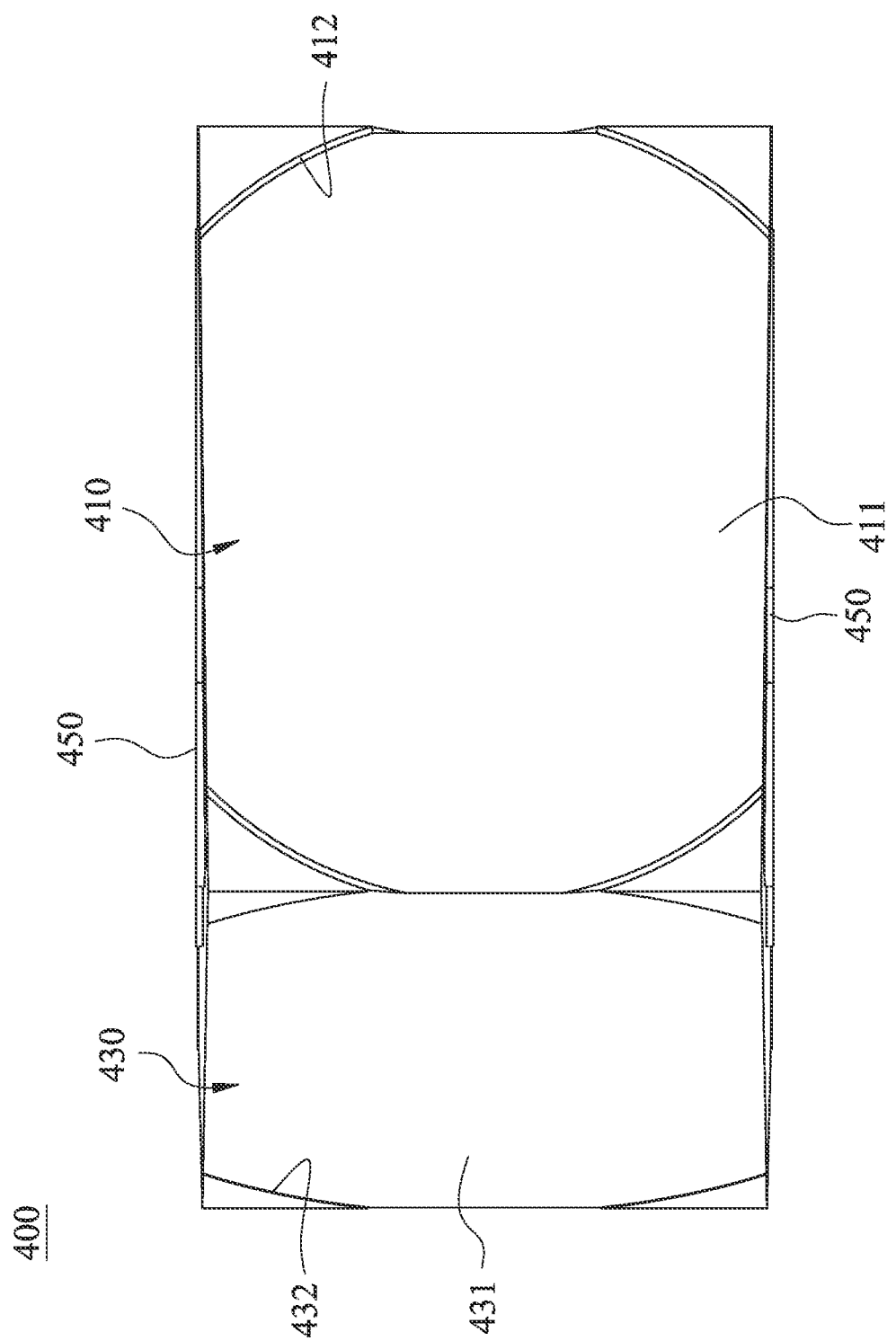
FIG. 4D is a schematic view of the incident surface and the reflective surface of the plastic light-folding element according to the 4th example in FIG. 4A.

FIG. 4D is a schematic view of the incident surface 410 and the reflective surface 430 of the plastic light-folding element 400 according to the 4th example in FIG. 4A. FIG. 4E is another schematic view of the incident surface 410 and the reflective surface 430 of the plastic light-folding element 400 according to the 4th example in FIG. 4A. In FIGS. 4A, 4B, 4D and 4E, the incident surface 410 includes an optical portion 411 and an arc step structure 412, the arc step structure 412 is disposed on a periphery of the optical portion 411, and an arc is formed by the arc step structure 412 centered on the optical portion 411, wherein the optical portion 411 includes a smooth surface. Therefore, the better flatness of the incident surface 410 can be provided. According to the 4th example, the arc step structure 412 includes a plurality of arcs, and the arcs are spaced apart from each other, wherein the arc step structure 412 is a concave step, and the concave step is that the optical portion 411 is lower than the periphery of the optical portion 411.

Each of the reflective surfaces 430 includes an optical portion 431 and an arc step structure 432, the arc step structure 432 is disposed on a periphery of the optical portion 431, and an arc is formed by the arc step structure 432 centered on the optical portion 431, wherein the optical portion 431 includes a smooth surface. Therefore, the better flatness of the reflective surfaces 430 can be provided. According to the 4th example, the arc step structure 432 includes a plurality of arcs, and the arcs are spaced apart from each other, wherein the arc step structure 432 is a concave step, and the concave step is that the optical portion 431 is lower than the periphery of the optical portion 431.

Moreover, both of the reflective surfaces 430 are configured to fold the imaging light L. Therefore, the number of the reflective surfaces can be provided according to the optical requirements and the mechanical requirements, so that the suitable disposition of the light path can be obtained to achieve the compact size.

In FIGS. 4A and 4B, the exit surface 420 includes an optical portion 421 and an arc step structure 422, the arc step structure 422 is disposed on a periphery of the optical portion 421, and an arc is formed by the arc step structure 422 centered on the optical portion 421, wherein the optical portion 421 includes a smooth surface. Therefore, the better flatness of the exit surface 420 can be provided. According to the 4th example, the arc step structure 422 includes a plurality of arcs, and the arcs are spaced apart from each other, wherein the arc step structure 422 is a concave step, and the concave step is that the optical portion 421 is lower than the periphery of the optical portion 421.

In FIGS. 4B, 4D and 4E, the surface accuracy of the optical surfaces (that is, the incident surface 410, the exit surface 420 and the reflective surfaces 430) can be further controlled by the arc step structures 412, 422, 432 disposed on the optical surfaces to reduce the dimensional tolerance of the optical surfaces.

Figure 4F:
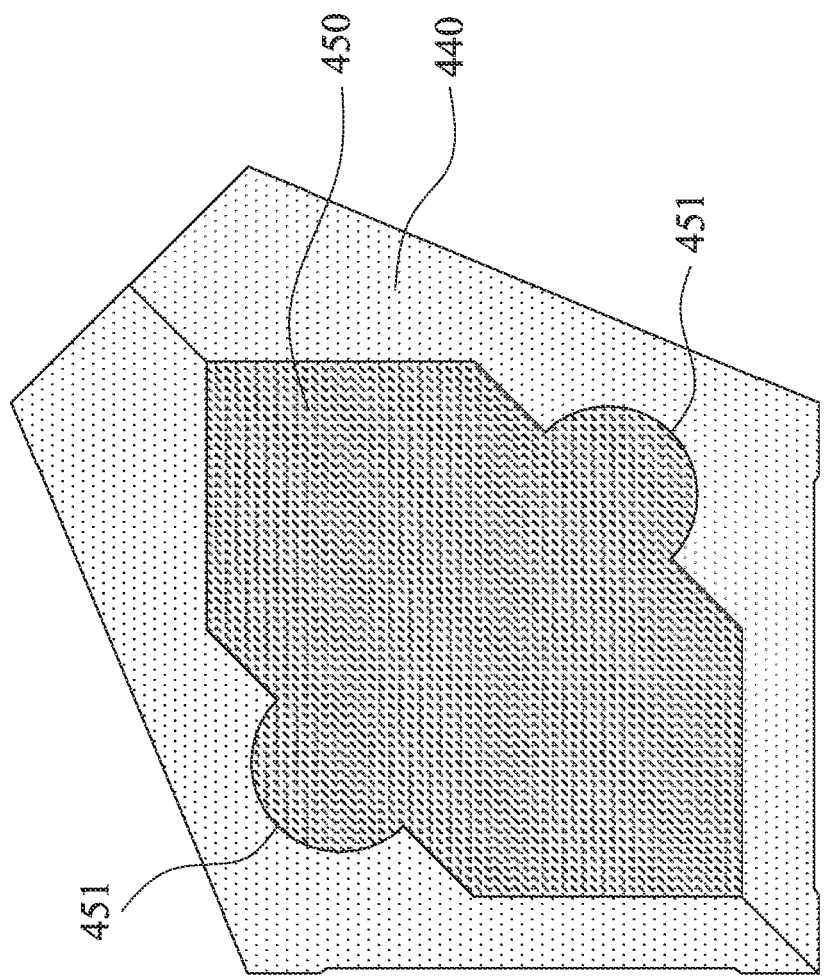
FIG. 4F is a schematic view of the parameters of the plastic light-folding element according to the 4th example in FIG. 4A.

FIG. 4F is a schematic view of the parameters of the plastic light-folding element 400 according to the 4th example in FIG. 4A. In FIGS. 4B, 4C and 4F, the shape of each of the gate vestige structures 450 is a combination of polygon and two semicircles, but the present disclosure is not limited thereto. Further, the surface characteristic of the gate vestige structures 450 is different from the surface characteristic of the connecting surfaces 440 without the gate vestige structure.

In FIG. 4F, each of the gate vestige structures 450 includes an arc rim 451 extending from a center of each of the gate vestige structures 450 towards an outer side of each of the gate vestige structures 450. Therefore, the gate vestige structures 450 can have the stable and fast injection rate to provide the feasibility of the mass production. According to the 4th example, a number of the arc rim 451 of each of the gate vestige structures 450 is two, but the number is not limited thereto.

In FIGS. 4A and 4F, when an area of each of the gate vestige structures 450 on each of the connecting surfaces 440 is Ag, a total area of each of the connecting surfaces 440 is At, a step height of each of the arc step structures 412, 422, 432 is h, and an abbe number of the plastic light-folding element 400 is V, the following conditions of the Table 4 are satisfied.

TABLE 4

| 4th example | | | |
|---|---|---|---|
| Ag (mm$^2$) | 47.1 | h (mm) (the arc step structure 412) | 0.07 |
| At (mm$^2$) | 95.03 | h (mm) (the arc step structure 422) | 0.07 |
| Ag/At (%) | 49.6 | h (mm) (the arc step structure 432) | 0.01 |
| V | 44.3 | | |

5th Example

Figure 5:
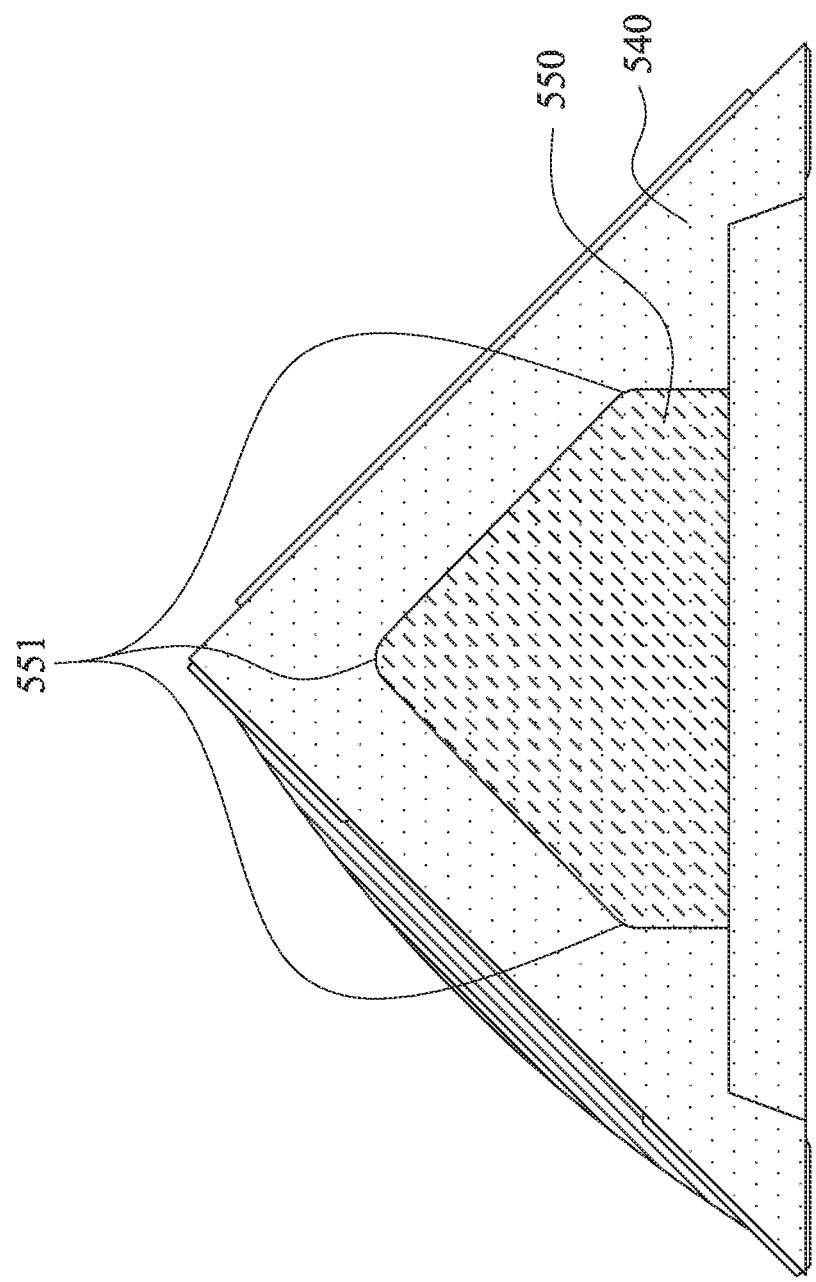
FIG. 5 is a schematic view of a connecting surface and a gate vestige structure according to the 5th example of the present disclosure.

FIG. 5 is a schematic view of a connecting surface 540 and a gate vestige structure 550 according to the 5th example of the present disclosure. In FIG. 5, a plastic light-folding element (its reference numeral is omitted) includes an incident surface (its reference numeral is omitted), an exit surface (its reference numeral is omitted), at least one reflective surface (its reference numeral is omitted), the connecting surface 540 and the gate vestige structure 550. The incident surface is configured to lead an imaging light (not shown) enter the plastic light-folding element. The exit surface is configured to lead the imaging light exit the plastic light-folding element. The reflective surface is configured to fold the imaging light. The connecting surface 540 is connected to the incident surface, the exit surface and the reflective surface. The gate vestige structure 550 is disposed on the connecting surface 540.

Furthermore, the shape of the gate vestige structure 550 is polygon, but the present disclosure is not limited thereto. Further, the surface characteristic of the gate vestige structure 550 is different from the surface characteristic of the connecting surface 540 without the gate vestige structure.

Further, the gate vestige structure 550 includes an arc rim 551 extending from a center of the gate vestige structure 550 towards an outer side of the gate vestige structure 550. Therefore, the gate vestige structure 550 can have the stable and fast injection rate to provide the feasibility of the mass production. According to the 5th example, a number of the arc rim 551 is three, but the number is not limited thereto.

When an area of the gate vestige structure 550 on the connecting surface 540 is Ag, a total area of the connecting surface 540 is At, and an abbe number of the plastic light-folding element is V, the following conditions of the Table 5 are satisfied.

TABLE 5

| 5th example | | | |
|---|---|---|---|
| Ag (mm$^2$) | 5.31 | Ag/At (%) | 33.2 |
| At (mm$^2$) | 16 | V | 56 |

Moreover, the gate vestige structure 550 according to the 5th example can be formed by the different injection channels with the plastic light-folding element 100 according to the 1st example, but the present disclosure is not limited thereto.

Further, all of other structures and dispositions according to the 5th example are the same as the structures and the dispositions according to the 1st example, and will not be described again herein.

6th Example

Figure 6:
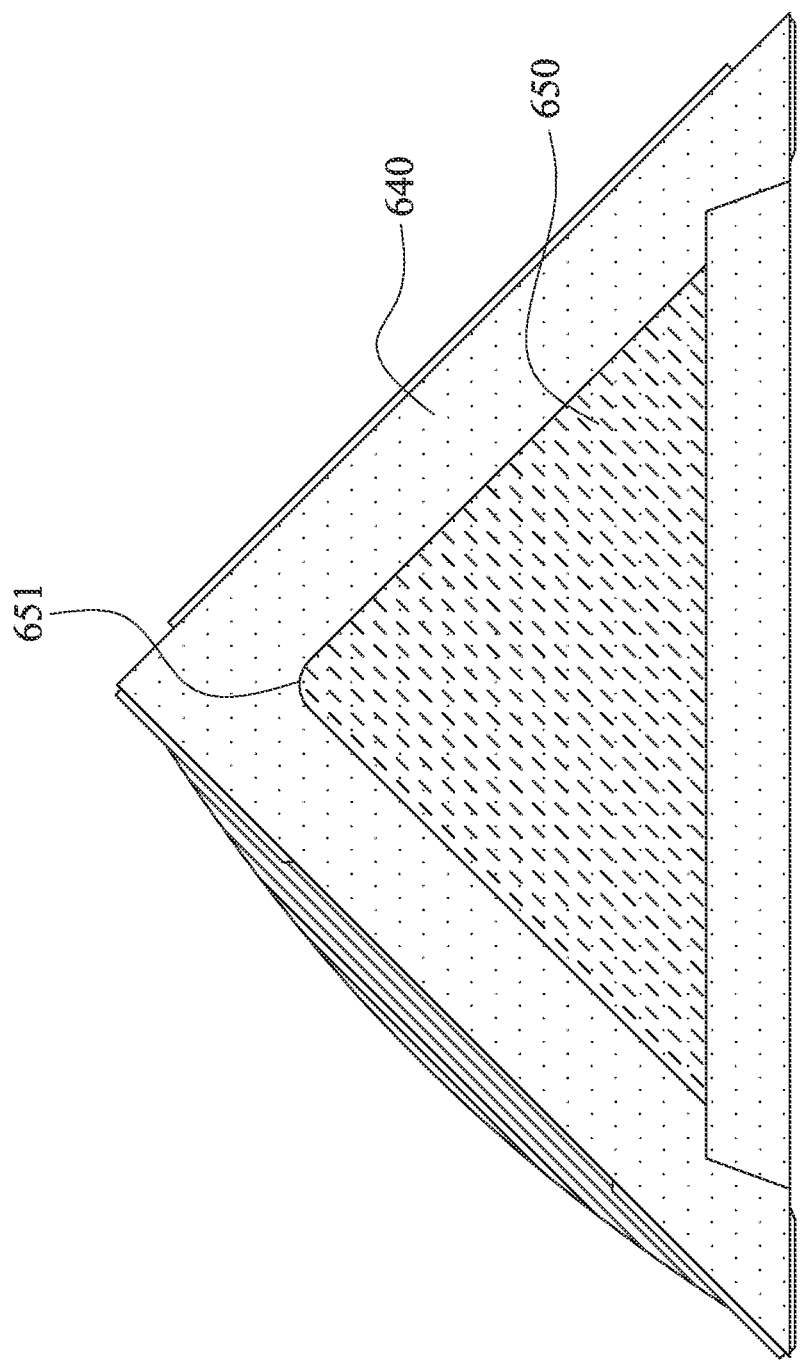
FIG. 6 is a schematic view of a connecting surface and a gate vestige structure according to the 6th example of the present disclosure.

FIG. 6 is a schematic view of a connecting surface 640 and a gate vestige structure 650 according to the 6th example of the present disclosure. In FIG. 6, a plastic light-folding element (its reference numeral is omitted) includes an incident surface (its reference numeral is omitted), an exit surface (its reference numeral is omitted), at least one reflective surface (its reference numeral is omitted), the connecting surface 640 and the gate vestige structure 650. The incident surface is configured to lead an imaging light (not shown) enter the plastic light-folding element. The exit surface is configured to lead the imaging light exit the plastic light-folding element. The reflective surface is configured to fold the imaging light. The connecting surface 640 is connected to the incident surface, the exit surface and the reflective surface. The gate vestige structure 650 is disposed on the connecting surface 640.

Furthermore, the shape of the gate vestige structure 650 is triangle, but the present disclosure is not limited thereto. Further, the surface characteristic of the gate vestige structure 650 is different from the surface characteristic of the connecting surface 640 without the gate vestige structure.

Further, the gate vestige structure 650 includes an arc rim 651 extending from a center of the gate vestige structure 650 towards an outer side of the gate vestige structure 650. Therefore, the gate vestige structure 650 can have the stable and fast injection rate to provide the feasibility of the mass production. According to the 6th example, a number of the arc rim 651 is one, but the number is not limited thereto.

When an area of the gate vestige structure 650 on the connecting surface 640 is Ag, a total area of the connecting surface 640 is At, and an abbe number of the plastic light-folding element is V, the following conditions of the Table 6 are satisfied.

TABLE 6

| 6th example | | | |
|---|---|---|---|
| Ag (mm$^2$) | 6.24 | Ag/At (%) | 39 |
| At (mm$^2$) | 16 | V | 56 |

Moreover, the gate vestige structure 650 according to the 6th example can be formed by the different injection channels with the plastic light-folding element 100 according to the 1st example, but the present disclosure is not limited thereto.

Further, all of other structures and dispositions according to the 6th example are the same as the structures and the dispositions according to the 1st example, and will not be described again herein.

7th Example

Figure 7:
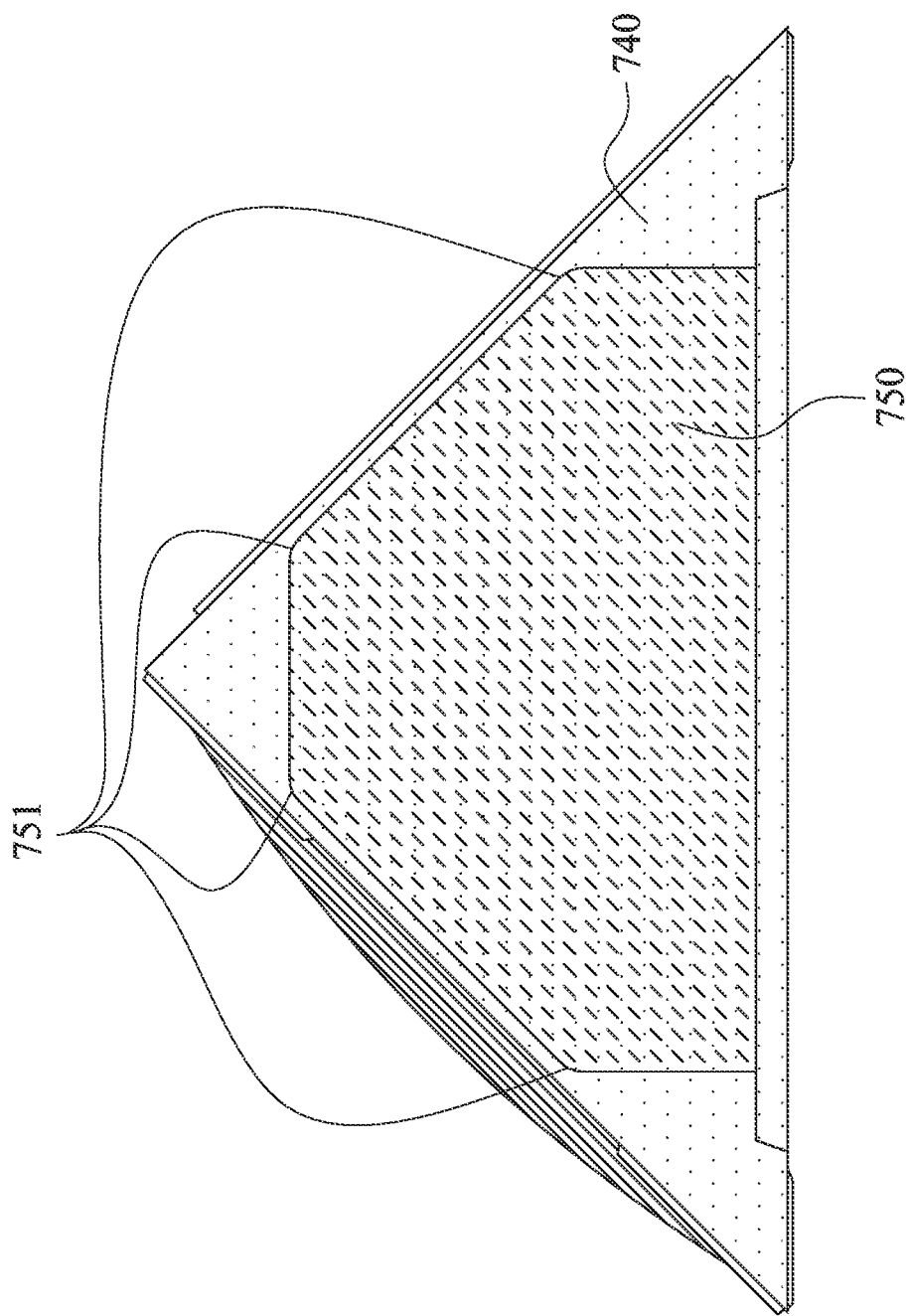
FIG. 7 is a schematic view of a connecting surface and a gate vestige structure according to the 7th example of the present disclosure.

FIG. 7 is a schematic view of a connecting surface 740 and a gate vestige structure 750 according to the 7th example of the present disclosure. In FIG. 7, a plastic light-folding element (its reference numeral is omitted) includes an incident surface (its reference numeral is omitted), an exit surface (its reference numeral is omitted), at least one reflective surface (its reference numeral is omitted), the connecting surface 740 and the gate vestige structure 750. The incident surface is configured to lead an imaging light (not shown) enter the plastic light-folding element. The exit surface is configured to lead the imaging light exit the plastic light-folding element. The reflective surface is configured to fold the imaging light. The connecting surface 740 is connected to the incident surface, the exit surface and the reflective surface. The gate vestige structure 750 is disposed on the connecting surface 740.

Furthermore, the shape of the gate vestige structure 750 is polygon, but the present disclosure is not limited thereto. Further, the surface characteristic of the gate vestige structure 750 is different from the surface characteristic of the connecting surface 740 without the gate vestige structure.

Further, the gate vestige structure 750 includes an arc rim 751 extending from a center of the gate vestige structure 750 towards an outer side of the gate vestige structure 750. Therefore, the gate vestige structure 750 can have the stable and fast injection rate to provide the feasibility of the mass production. According to the 7th example, a number of the arc rim 751 is four, but the number is not limited thereto.

When an area of the gate vestige structure 750 on the connecting surface 740 is Ag, a total area of the connecting surface 740 is At, and an abbe number of the plastic light-folding element is V, the following conditions of the Table 7 are satisfied.

TABLE 7

| 7th example | | | |
|---|---|---|---|
| Ag (mm$^2$) | 11.46 | Ag/At (%) | 71.6 |
| At (mm$^2$) | 16 | V | 56 |

Moreover, the gate vestige structure 750 according to the 7th example can be formed by the different injection channels with the plastic light-folding element 100 according to the 1st example, but the present disclosure is not limited thereto.

Further, all of other structures and dispositions according to the 7th example are the same as the structures and the dispositions according to the 1st example, and will not be described again herein.

8th Example

Figure 8:
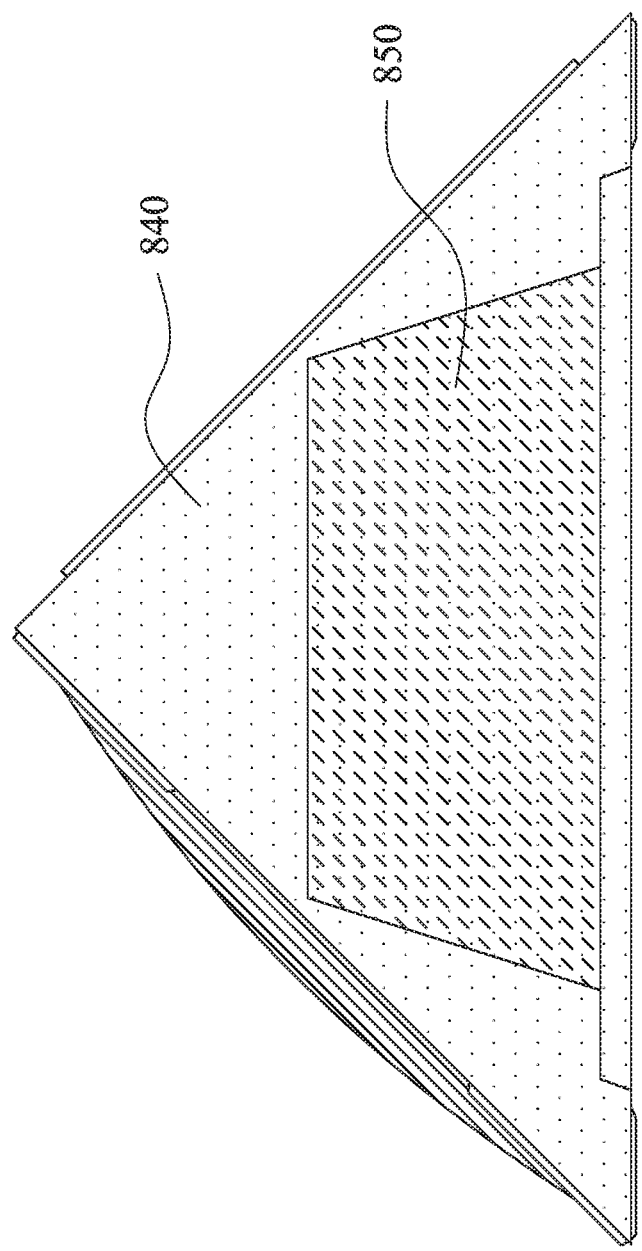
FIG. 8 is a schematic view of a connecting surface and a gate vestige structure according to the 8th example of the present disclosure.

FIG. 8 is a schematic view of a connecting surface 840 and a gate vestige structure 850 according to the 8th example of the present disclosure. In FIG. 8, a plastic light-folding element (its reference numeral is omitted) includes an incident surface (its reference numeral is omitted), an exit surface (its reference numeral is omitted), at least one reflective surface (its reference numeral is omitted), the connecting surface 840 and the gate vestige structure 850. The incident surface is configured to lead an imaging light (not shown) enter the plastic light-folding element. The exit surface is configured to lead the imaging light exit the plastic light-folding element. The reflective surface is configured to fold the imaging light. The connecting surface 840 is connected to the incident surface, the exit surface and the reflective surface. The gate vestige structure 850 is disposed on the connecting surface 840.

Furthermore, the shape of the gate vestige structure 850 is trapezoid, but the present disclosure is not limited thereto. Further, the surface characteristic of the gate vestige structure 850 is different from the surface characteristic of the connecting surface 840 without the gate vestige structure.

When an area of the gate vestige structure 850 on the connecting surface 840 is Ag, a total area of the connecting surface 840 is At, and an abbe number of the plastic light-folding element is V, the following conditions of the Table 8 are satisfied.

TABLE 8

| 8th example | | | |
|---|---|---|---|
| Ag (mm$^2$) | 7.79 | Ag/At (%) | 48.7 |
| At (mm$^2$) | 16 | V | 56 |

Moreover, the gate vestige structure 850 according to the 8th example can be formed by the different injection channels with the plastic light-folding element 100 according to the 1st example, but the present disclosure is not limited thereto.

Further, all of other structures and dispositions according to the 8th example are the same as the structures and the dispositions according to the 1st example, and will not be described again herein.

9th Example

Figure 9A:
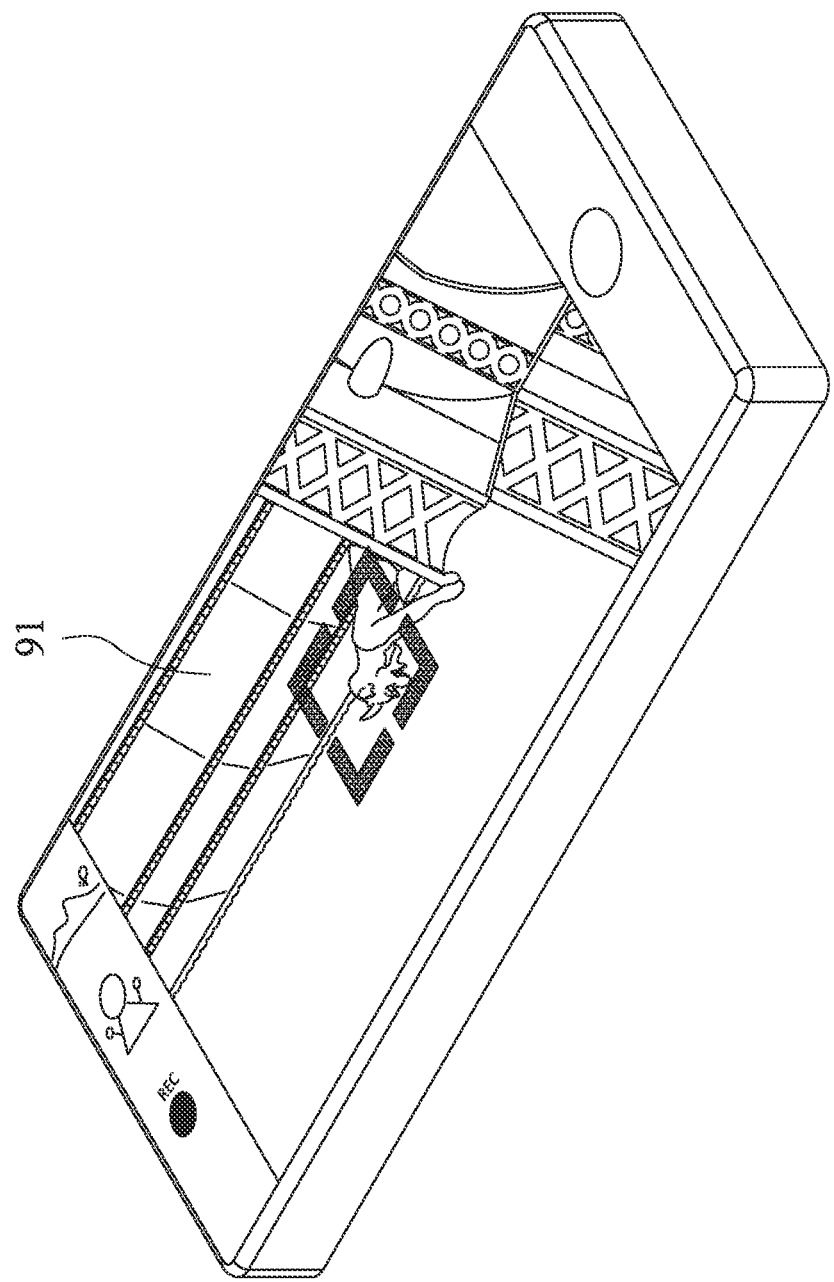
FIG. 9A is a schematic view of an electronic device according to the 9th example of the present disclosure.
Figure 9B:
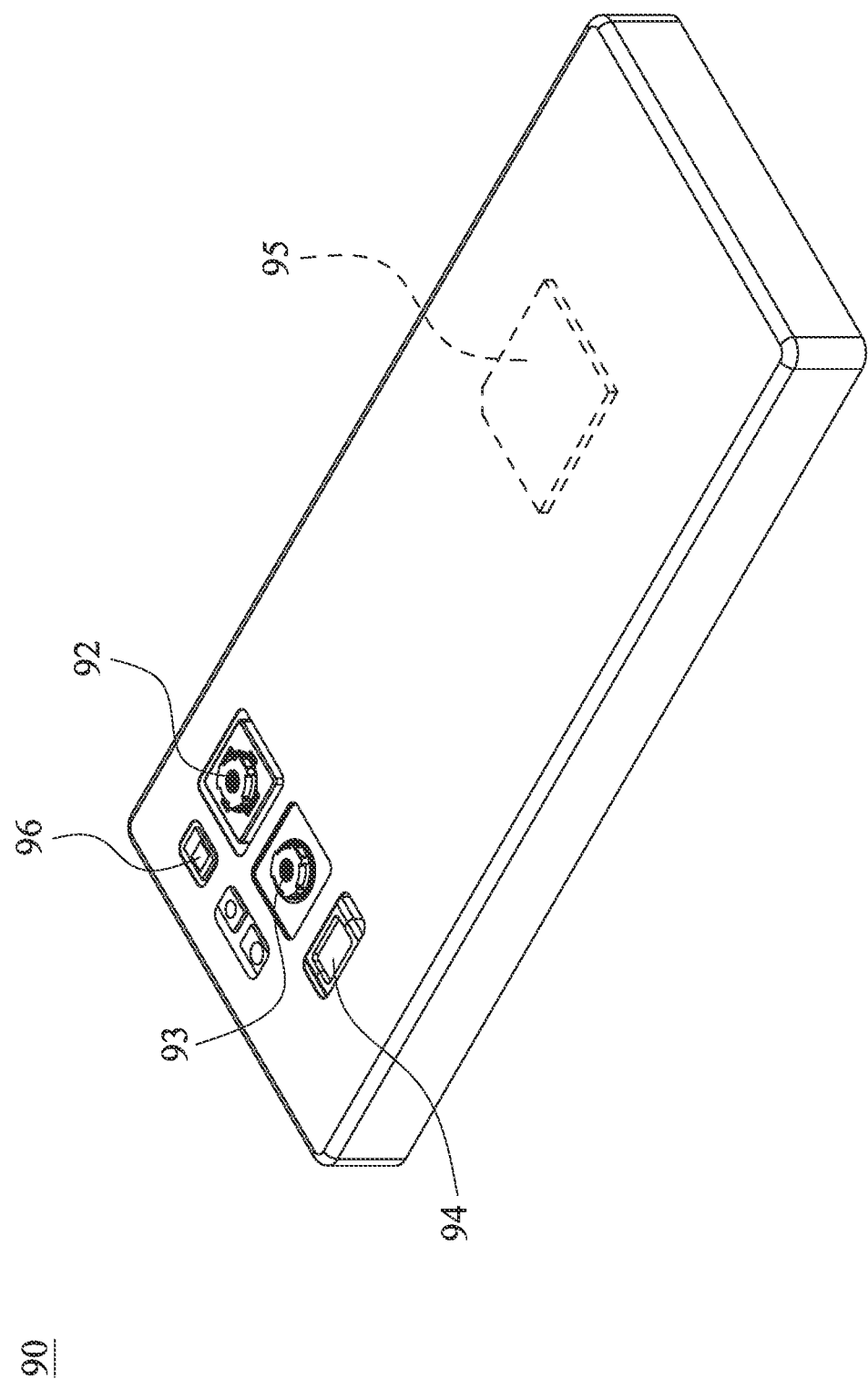
FIG. 9B is another schematic view of the electronic device according to the 9th example in FIG. 9A.

FIG. 9A is a schematic view of an electronic device 90 according to the 9th example of the present disclosure. FIG. 9B is another schematic view of the electronic device 90 according to the 9th example in FIG. 9A. In FIGS. 9A and 9B, the electronic device 90 according to the 9th example is a smart phone, and includes an imaging lens assembly module (its reference numeral is omitted) and an image sensor (not shown), wherein the image sensor is disposed on an image surface (not shown) of the imaging lens assembly module, and the imaging lens assembly module includes an ultra-wide angle camera module 92, a high resolution camera module 93 and a telephoto camera module 94. Furthermore, the imaging lens assembly module includes a plastic light-folding element (not shown) and an imaging lens element set (not shown), wherein the plastic light-folding element is disposed on one of an object side and an image side of the imaging lens element set.

Moreover, the telephoto camera module 94 can be one of the imaging lens assembly modules according to the aforementioned 1st example to the 8th example, but the present disclosure is not limited thereto. Therefore, it is favorable for satisfying the requirements of the mass production and the appearance of the imaging lens assembly module mounted on the electronic devices according to the current marketplace of the electronic device.

Moreover, users enter a shooting mode via the user interface 91 of the electronic device 90, wherein the user interface 91 according to the 9th example can be a touch screen for displaying the scene and have the touch function, and the shooting angle can be manually adjusted to switch the ultra-wide angle camera module 92, the high resolution camera module 93 and the telephoto camera module 94. At this moment, the imaging light is gathered on the image sensor via the imaging lens assembly module, and an electronic signal about an image is output to an image signal processor (ISP) 95.

In FIG. 9B, to meet a specification of the electronic device 90, the electronic device 90 can further include an optical anti-shake mechanism (not shown). Furthermore, the electronic device 90 can further include at least one focusing assisting module (its reference numeral is omitted) and at least one sensing element (not shown). The focusing assisting module can be a flash module 96 for compensating a color temperature, an infrared distance measurement component, a laser focus module, etc. The sensing element can have functions for sensing physical momentum and kinetic energy, such as an accelerator, a gyroscope, a Hall Effect Element, to sense shaking or jitters applied by hands of the user or external environments. Accordingly, the electronic device 90 equipped with an auto-focusing mechanism and the optical anti-shake mechanism can be enhanced to achieve the superior image quality. Furthermore, the electronic device 90 according to the present disclosure can have a capturing function with multiple modes, such as taking optimized selfies, high dynamic range (HDR) under a low light condition, 4K resolution recording, etc. Furthermore, the users can visually see a captured image of the camera through the user interface 91 and manually operate the view finding range on the user interface 91 to achieve the auto-focus function of what you see is what you get.

Moreover, the imaging lens assembly module, the image sensor, the optical anti-shake mechanism, the sensing element and the focusing assisting module can be disposed on a flexible printed circuit board (FPC) (not shown) and electrically connected to the associated components, such as the imaging signal processor 95, via a connector (not shown) to perform a capturing process. Since the current electronic devices, such as smart phones, have a tendency of being compact, the way of firstly disposing the imaging lens assembly module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly module can also be controlled more flexibly via the touch screen of the electronic device. According to the 9th example, the electronic device 90 includes a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 95, via corresponding connectors to perform the capturing process. In other examples (not shown herein), the sensing elements and the focusing assisting modules can also be disposed on the main board of the electronic device or carrier boards of other types according to requirements of the mechanical design and the circuit layout.

Furthermore, the electronic device 90 can further include, but not be limited to, a display, a control unit, a storage unit, a random access memory (RAM), a read-only memory (ROM), or the combination thereof.

Figure 9C:
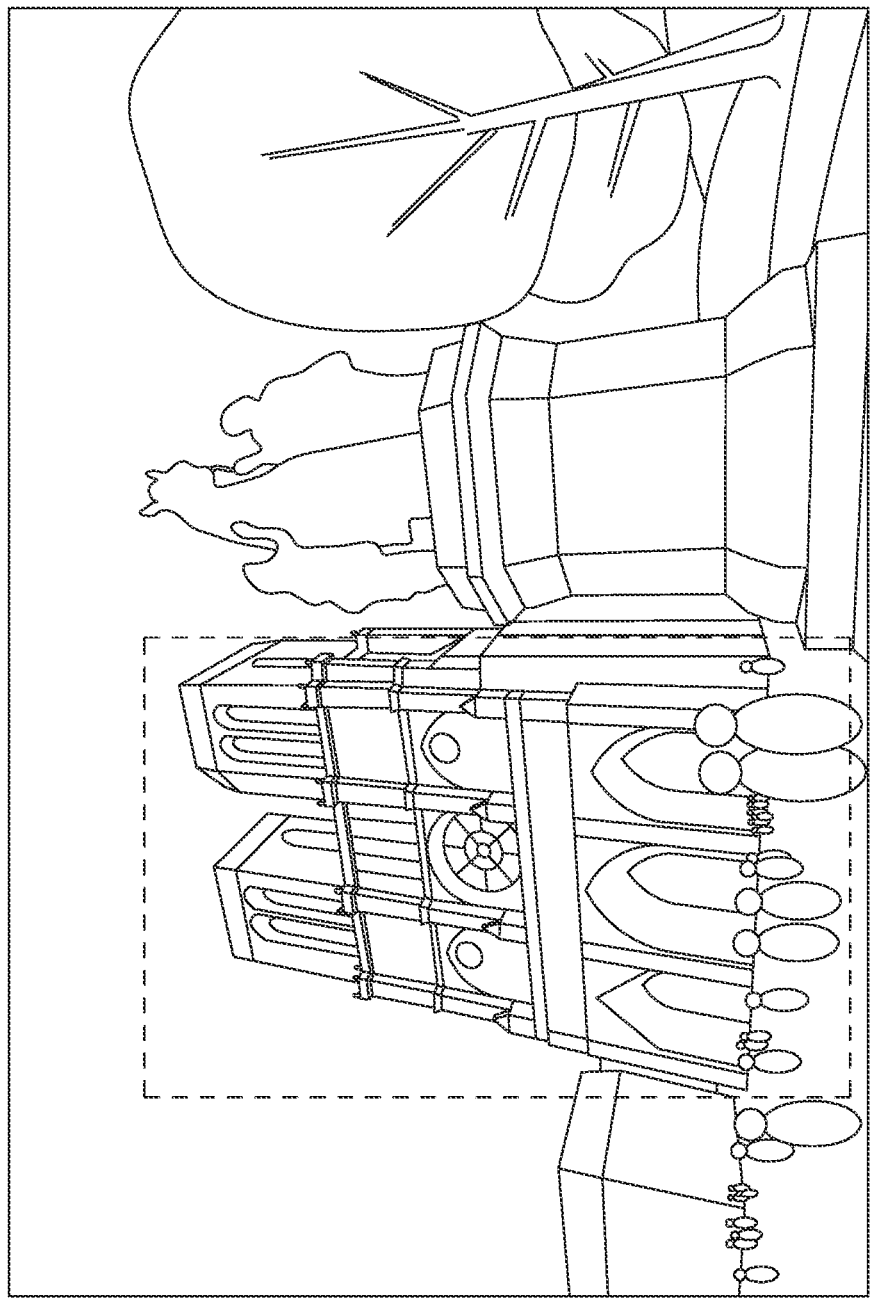
FIG. 9C is a schematic view of an image according to the 9th example in FIG. 9A.

FIG. 9C is a schematic view of an image according to the 9th example in FIG. 9A. In FIG. 9C, the larger range of the image can be captured via the ultra-wide angle camera module 92, and the ultra-wide angle camera module 92 has the function of accommodating more wide range of the scene.

Figure 9D:
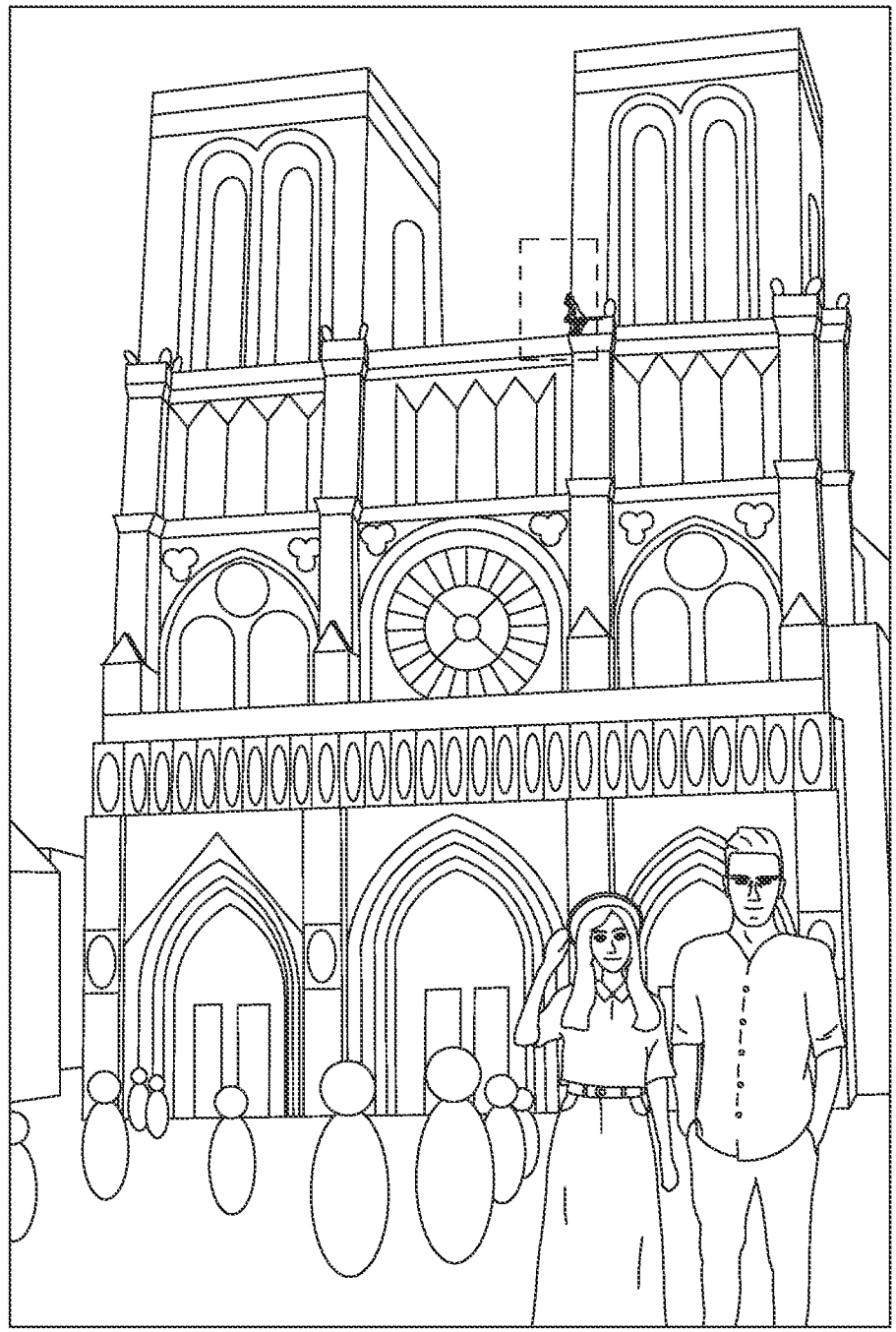
FIG. 9D is another schematic view of an image according to the 9th example in FIG. 9A.

FIG. 9D is another schematic view of an image according to the 9th example in FIG. 9A. In FIG. 9D, the image of the certain range with the high resolution can be captured via the high resolution camera module 93, and the high resolution camera module 93 has the function of the high resolution and the low deformation.

Figure 9E:
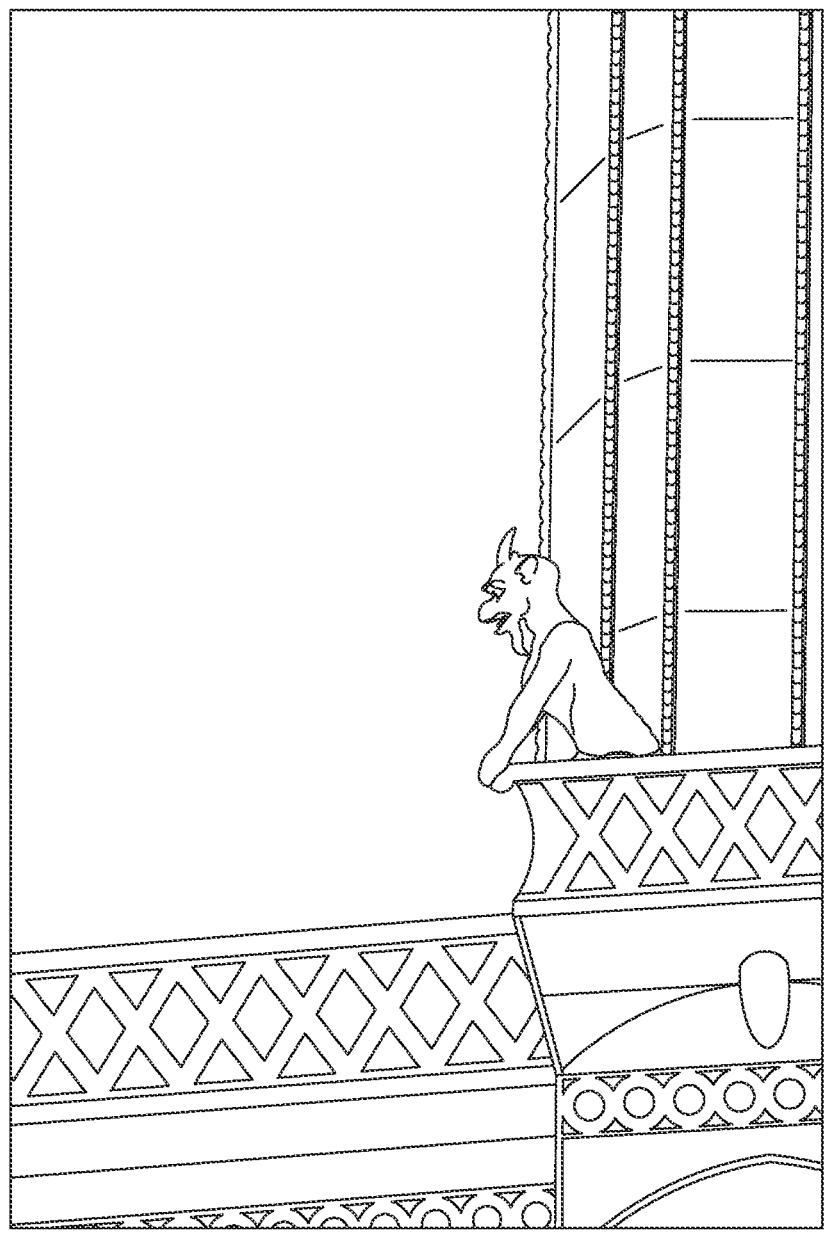
FIG. 9E is further another schematic view of an image according to the 9th example in FIG. 9A.

FIG. 9E is further another schematic view of an image according to the 9th example in FIG. 9A. In FIG. 9E, the telephoto camera module 94 has the enlarging function of the high magnification, and the distant image can be captured and enlarged with high magnification via the telephoto camera module 94.

In FIGS. 9C to 9E, the zooming function can be obtained via the electronic device 90, when the scene is captured via the imaging lens assembly module with different focal lengths cooperated with the function of image processing.

10th Example

Figure 10A:
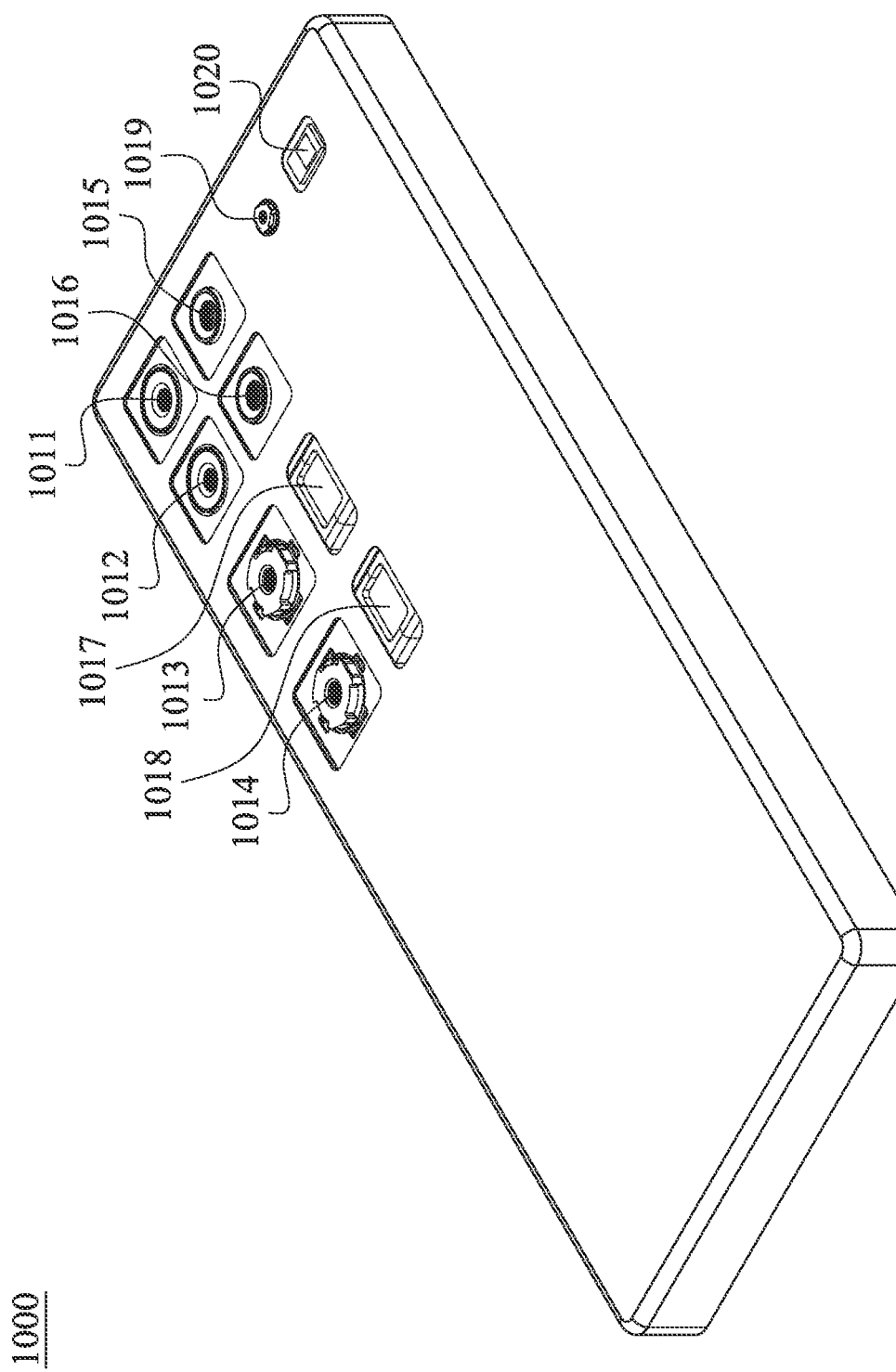
FIG. 10A is a schematic view of an electronic device according to the 10th example of the present disclosure.
Figure 10B:
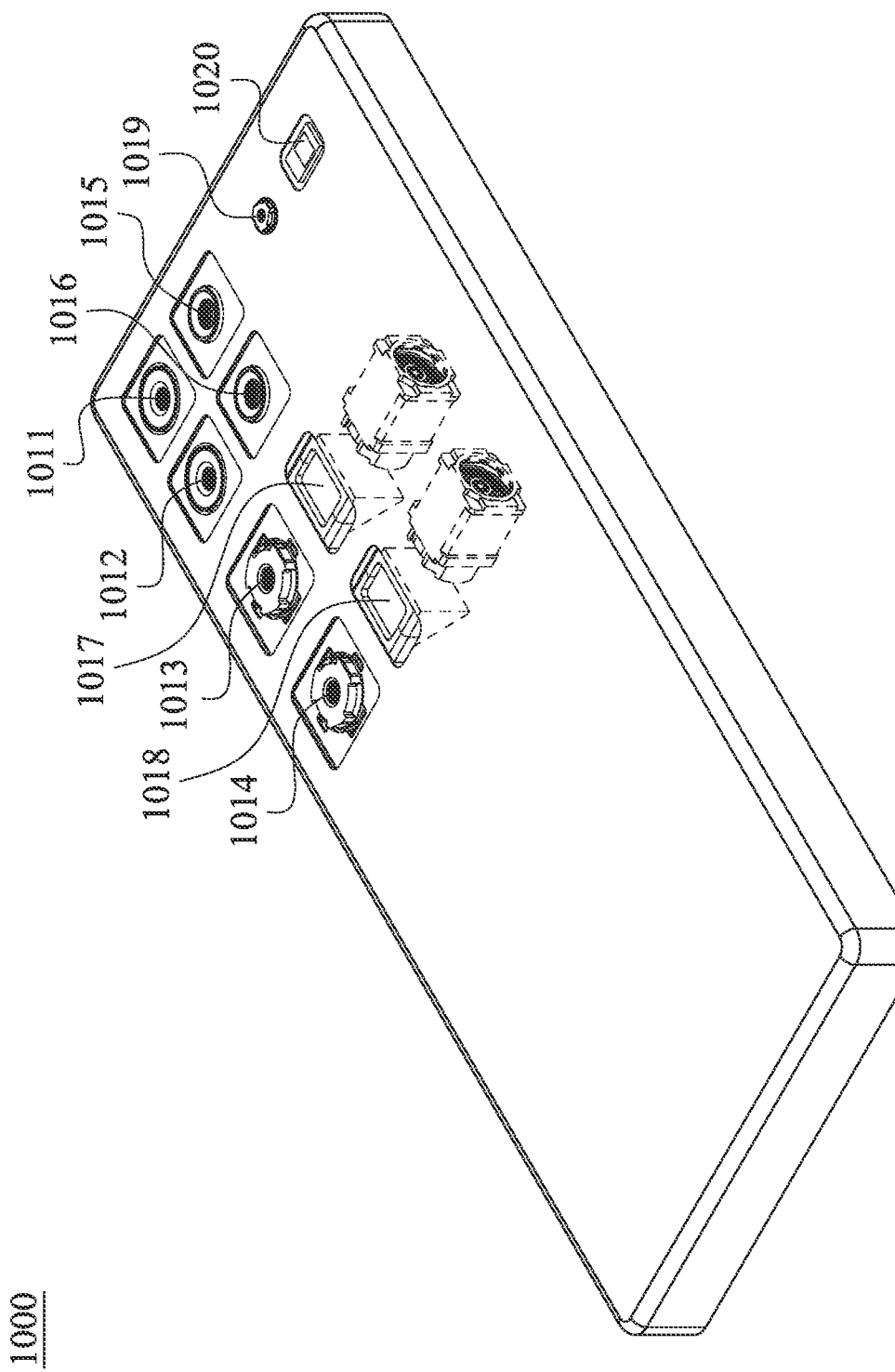
FIG. 10B is a partial perspective schematic view of the electronic device according to the 10th example in FIG. 10A.

FIG. 10A is a schematic view of an electronic device 1000 according to the 10th example of the present disclosure. FIG. 10B is a partial perspective schematic view of the electronic device 1000 according to the 10th example in FIG. 10A. In FIGS. 10A and 10B, the electronic device 1000 is a smart phone, and includes an imaging lens assembly module (its reference numeral is omitted) and an image sensor (not shown), wherein the image sensor is disposed on an image surface (not shown) of the imaging lens assembly module, and the imaging lens assembly module includes ultra-wide angle camera modules 1011, 1012, wide angle camera modules 1013, 1014, telephoto camera modules 1015, 1016, 1017, 1018 and a Time-Of-Flight (TOF) module 1019. The TOF module 1019 can be another type of the imaging apparatus, and the disposition is not limited thereto.

Moreover, the telephoto camera modules 1015, 1016, 1017, 1018 can be one of the imaging lens assembly modules according to the aforementioned 1st example to the 8th example, but the present disclosure is not limited thereto. Therefore, it is favorable for satisfying the requirements of the mass production and the appearance of the imaging lens assembly module mounted on the electronic devices according to the current marketplace of the electronic device.

Further, the telephoto camera modules 1017, 1018 are configured to fold the light, but the present disclosure is not limited thereto.

To meet a specification of the electronic device 1000, the electronic device 1000 can further include an optical anti-shake mechanism (not shown). Furthermore, the electronic device 1000 can further include at least one focusing assisting module (not shown) and at least one sensing element (not shown). The focusing assisting module can be a flash module 1020 for compensating a color temperature, an infrared distance measurement component, a laser focus module, etc. The sensing element can have functions for sensing physical momentum and kinetic energy, such as an accelerator, a gyroscope, a Hall Effect Element, to sense shaking or jitters applied by hands of the user or external environments. Accordingly, the electronic device 1000 equipped with an auto-focusing mechanism and the optical anti-shake mechanism can be enhanced to achieve the superior image quality. Furthermore, the electronic device 1000 according to the present disclosure can have a capturing function with multiple modes, such as taking optimized selfies, High Dynamic Range (HDR) under a low light condition, 4K Resolution recording, etc.

Further, all of other structures and dispositions according to the 10th example are the same as the structures and the dispositions according to the 9th example, and will not be described again herein.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A plastic light-folding element, comprising:
  an incident surface configured to let an imaging light enter the plastic light-folding element;
  an exit surface configured to let the imaging light exit the plastic light-folding element;
  at least one reflective surface configured to fold the imaging light;

at least one connecting surface connected to the incident surface, the exit surface and the at least one reflective surface; and at least one gate vestige structure disposed on the at least one connecting surface;

wherein each of the incident surface, the exit surface and the at least one reflective surface comprises an optical portion and an arc step structure, each of the arc step structures is disposed on a periphery of each of the optical portions, and an arc is formed by each of the arc step structures centered on each of the optical portions;

wherein an area of the at least one gate vestige structure on the at least one connecting surface is Ag, a total area of the at least one connecting surface is At, a step height of each of the arc step structures is h, and the following conditions are satisfied:

$$33\% \leq Ag/At \leq 90\%; \text{ and}$$

$$0.003 \text{ mm} \leq h \leq 0.17 \text{ mm}.$$

2. The plastic light-folding element of claim 1, wherein a number of the at least one connecting surface is two, both of the two connecting surfaces are connected to the incident surface, the exit surface and the at least one reflective surface, and the two connecting surfaces are correspondingly disposed.

3. The plastic light-folding element of claim 2, wherein a number of the at least one gate vestige structure is two, and the two gate vestige structures are disposed on the two connecting surfaces, respectively.

4. The plastic light-folding element of claim 2, wherein the two connecting surfaces are essentially parallel to each other.

5. The plastic light-folding element of claim 1, wherein the at least one connecting surface is essentially orthogonal to the incident surface, the exit surface and the at least one reflective surface, respectively.

6. The plastic light-folding element of claim 1, wherein the optical portion comprises a smooth surface.

7. The plastic light-folding element of claim 1, wherein the optical portion comprises an optical aspheric surface located on a center of the optical portion.

8. The plastic light-folding element of claim 1, wherein the area of the at least one gate vestige structure on the at least one connecting surface is Ag, the total area of the at least one connecting surface is At, and the following condition is satisfied:

$$35\% \leq Ag/At \leq 80\%.$$

9. The plastic light-folding element of claim 1, wherein an abbe number of the plastic light-folding element is V, and the following condition is satisfied:

$$40 \leq V \leq 72.$$

10. The plastic light-folding element of claim 1, wherein a number of the at least one reflective surface is two, and both of the two reflective surfaces are configured to fold the imaging light.

11. The plastic light-folding element of claim 10, wherein the two reflective surfaces are essentially orthogonal to each other.

12. The plastic light-folding element of claim 10, wherein each of the incident surface, the exit surface and the two reflective surfaces comprises the optical portion and the arc step structure, each of the arc step structures is disposed on the periphery of each of the optical portions, and the arc is formed by each of the arc step structures centered on each of the optical portions.

13. The plastic light-folding element of claim 1, wherein the at least one gate vestige structure comprises an arc rim extending from a center of the at least one gate vestige structure towards an outer side of the at least one gate vestige structure.

14. The plastic light-folding element of claim 1, wherein the step height of each of the arc step structures is h, and the following condition is satisfied:

$$0.005 \text{ mm} \leq h \leq 0.07 \text{ mm}.$$

15. An imaging lens assembly module, comprising:
the plastic light-folding element of claim 1; and
an imaging lens element set, wherein the plastic light-folding element is disposed on one of an object side and an image side of the imaging lens element set.

16. An electronic device, comprising:
the imaging lens assembly module of claim 15; and
an image sensor disposed on an image surface of the imaging lens assembly module.

* * * * *